(12) United States Patent
Iino et al.

(10) Patent No.: US 8,169,984 B2
(45) Date of Patent: May 1, 2012

(54) COMMUNICATION SYSTEM, RADIO LAN BASE STATION CONTROL DEVICE, AND RADIO LAN BASE STATION DEVICE

(75) Inventors: Satoshi Iino, Tokyo (JP); Hironori Matsui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1255 days.

(21) Appl. No.: 11/631,512

(22) PCT Filed: Jun. 7, 2005

(86) PCT No.: PCT/JP2005/010399
§ 371 (c)(1),
(2), (4) Date: Jan. 4, 2007

(87) PCT Pub. No.: WO2006/006325
PCT Pub. Date: Jan. 19, 2006

(65) Prior Publication Data
US 2008/0304456 A1 Dec. 11, 2008

(30) Foreign Application Priority Data

Jul. 8, 2004 (JP) .................................. 2004-201945
Oct. 22, 2004 (JP) .................................. 2004-308443

(51) Int. Cl.
*H04W 4/00* (2009.01)

(52) U.S. Cl. ........ 370/338; 455/450; 455/451; 455/452; 455/453

(58) Field of Classification Search .................. 370/338; 455/450–453
See application file for complete search history.

(56) References Cited

U.S. PATENT DOCUMENTS

| 7,023,825 B1 * | 4/2006 | Haumont et al. ............. 370/338 |
| 7,298,702 B1 * | 11/2007 | Jones et al. .................... 370/235 |
| 7,346,025 B2 * | 3/2008 | Bryson .......................... 370/328 |
| 7,673,048 B1 * | 3/2010 | O'Toole et al. ............... 709/226 |
| 7,876,704 B1 * | 1/2011 | Bims et al. .................... 370/254 |

(Continued)

FOREIGN PATENT DOCUMENTS

CN 1490978 4/2004
(Continued)

OTHER PUBLICATIONS

International Search Report dated Sep. 6, 2005.
P. Calhoun, et al.: "Light Weight Access Point Protocol (LWAPP)" draft-ohara-capwap-lwapp-00, IETF Draft, Nov. 6, 2004, pp. 1-67.
Chinese Office Action dated Jun. 6, 2008 w/ English translation.

(Continued)

*Primary Examiner* — Kamran Afshar
*Assistant Examiner* — Edward Zhang
(74) *Attorney, Agent, or Firm* — Seed IP Law Group PLLC

(57) ABSTRACT

There are provided a communication system, a radio LAN base station control device, and a radio LAN base station device capable of increasing the control reliability and improving communication stability and safety between the radio LAN base station control device and the radio LAN base station device. In this communication system (10), a plurality of data tunnels are formed between an AP control device (100) and the radio LAN base station device (200) and the data tunnels are used according to the frame type (control data frame, data frame, etc.) so as to increase the reliability that the AP control frame reaches the radio LAN base station device (200). As a result, control reliability between the AP control device (100) and the radio LAN base station device (200) is increased. Thus, it is possible to improve the communication stability and safety in the communication system (10).

20 Claims, 36 Drawing Sheets

U.S. PATENT DOCUMENTS

| | | | |
|---|---|---|---|
| 2001/0055300 A1* | 12/2001 | Chen ............................. | 370/352 |
| 2002/0089958 A1* | 7/2002 | Feder et al. ................... | 370/338 |
| 2002/0191572 A1* | 12/2002 | Weinstein et al. ............ | 370/338 |
| 2004/0095916 A1* | 5/2004 | Maki et al. .................... | 370/338 |
| 2004/0139201 A1* | 7/2004 | Chaudhary et al. ........... | 709/229 |
| 2004/0208156 A1* | 10/2004 | Chu et al. ...................... | 370/338 |

FOREIGN PATENT DOCUMENTS

| | | |
|---|---|---|
| JP | 2004096169 | 3/2004 |
| WO | 02097560 | 12/2002 |
| WO | 2005/081862 A2 | 9/2005 |

OTHER PUBLICATIONS

Kazuto, A., "Course for completely understanding IPsec, Key to the safe use is tunneling," Nikkei Network, 44:51-71, Nov. 22, 2003.

Office Action mailed Nov. 24, 2010, for corresponding Japanese Application No. 2004-308443, 2 pages.

European Search Report, dated Apr. 12, 2011, for EP 05 74 8924, 4 pages.

Yang et al. (eds.), "Architecture Taxonomy for Control and Provisioning of Wireless Access Points (CAPWAP)," draft-ietf-capwap-arch-03, IETF Draft, Jun. 29, 2004, pp. 1-96.

* cited by examiner

AP CONTROL TUNNEL TABLE

| TUNNEL ID | TUNNEL IDENTIFIER | |
|---|---|---|
| | DESTINATION MAC ADDRESS | SENDER MAC ADDRESS |
| 1 | X | S |
| 2 | Y | S |
| .. | | |

FIG.4A

DATA FRAME TUNNEL TABLE

| TUNNEL ID | TUNNEL IDENTIFIER | |
|---|---|---|
| | DESTINATION MAC ADDRESS | SENDER MAC ADDRESS |
| 1 | A-1 | S |
| 2 | A-2 | S |
| 3 | A-3 | S |
| 4 | B-1 | S |
| 5 | B-2 | S |
| 6 | B-3 | S |
| .. | | |

FIG.4B

DATA FRAME CORRESPONDENCE TABLE

| index | TERMINAL IDENTIFIER | TUNNEL ID |
|---|---|---|
| 1 | T1 | 1 |
| 2 | T2 | 3 |
| 3 | T3 | 5 |
| 4 | T4 | 1 |
| 5 | T5 | 4 |
| 6 | T6 | 2 |
| .. | .. | .. |

FIG.4C

AP CONTROL TUNNEL TABLE

| TUNNEL ID | TUNNEL IDENTIFIER | |
|---|---|---|
| | DESTINATION MAC ADDRESS | SENDER MAC ADDRESS |
| 1 | S | X |

FIG.7A

DATA FRAME TUNNEL TABLE

| TUNNEL ID | TUNNEL IDENTIFIER | |
|---|---|---|
| | DESTINATION MAC ADDRESS | SENDER MAC ADDRESS |
| 1 | S | A-1 |
| 2 | S | A-2 |
| 3 | S | A-3 |

AP CONTROL TUNNEL TABLE

| TUNNEL ID | TUNNEL IDENTIFIER | | |
|---|---|---|---|
| | DESTINATION MAC ADDRESS | SENDER MAC ADDRESS | VLAN TAG ID |
| 1 | X | S | #1 |
| 2 | Y | S | #2 |
| .. | .. | .. | .. |

FIG.19B

DATA FRAME TUNNEL TABLE

| TUNNEL ID | BSSID | TUNNEL IDENTIFIER | | |
|---|---|---|---|---|
| | | DESTINATION MAC ADDRESS | SENDER MAC ADDRESS | VLAN TAG ID |
| 1 | A-1 | X | S | #100 |
| 2 | A-2 | X | S | #200 |
| 3 | A-3 | X | S | #300 |
| 4 | B-1 | Y | S | #200 |
| 5 | B-2 | Y | S | #300 |
| 6 | B-3 | Y | S | #100 |
| .. | .. | .. | .. | .. |

FIG.19C

DATA FRAME CORRESPONDENCE TABLE

| index | TERMINAL IDENTIFIER | TUNNEL ID |
|---|---|---|
| 1 | T1 | 1 |
| 2 | T2 | 3 |
| 3 | T3 | 5 |
| 4 | T4 | 1 |
| 5 | T5 | 4 |
| 6 | T6 | 2 |
| .. | .. | .. |

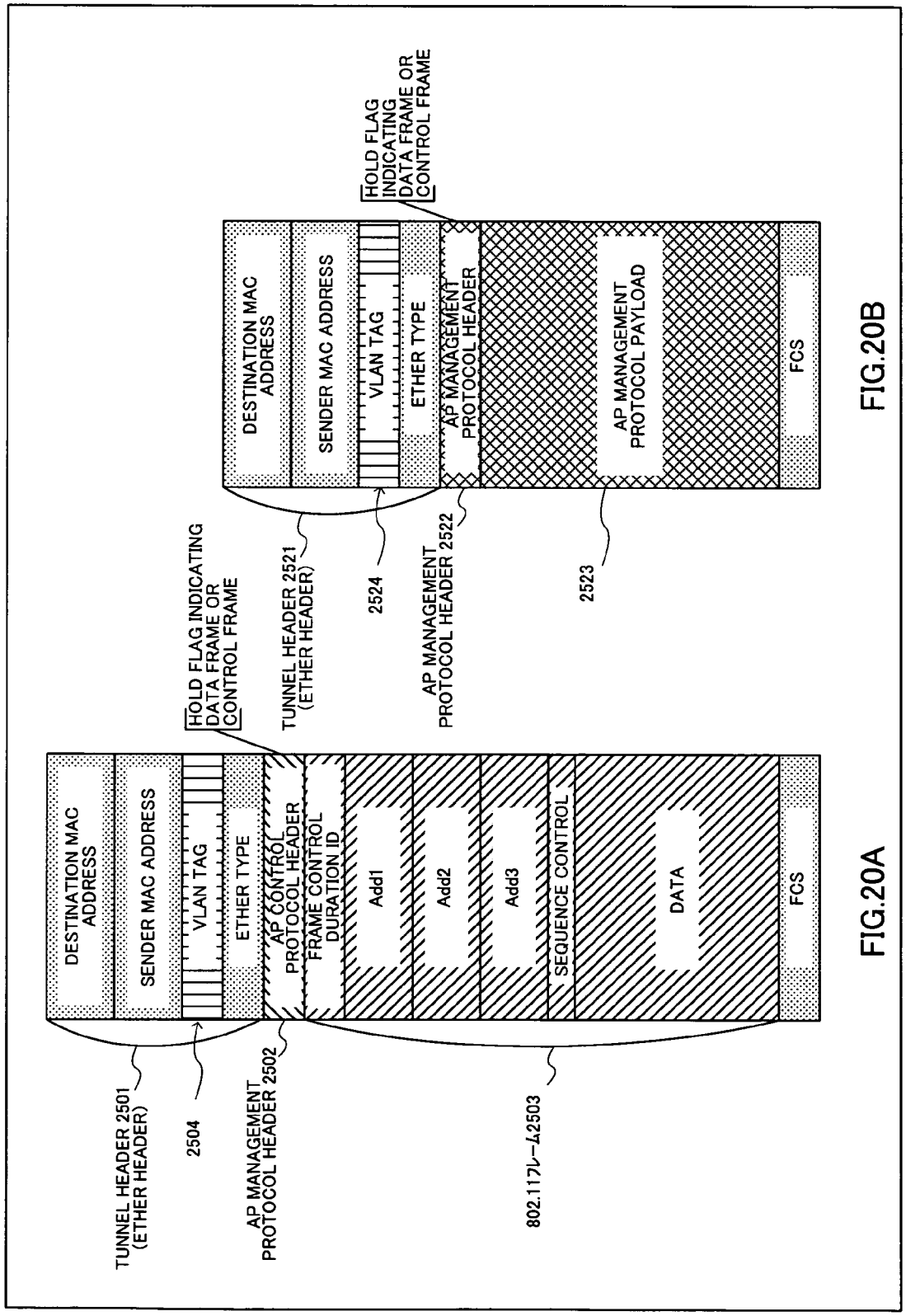

AP CONTROL TUNNEL TABLE

| TUNNEL ID | TUNNEL IDENTIFIER | | |
|---|---|---|---|
| | DESTINATION MAC ADDRESS | SENDER MAC ADDRESS | VLAN TAG ID |
| 1 | S | X | #1 |

FIG.22A

DATA FRAME TUNNEL TABLE

| TUNNEL ID | TUNNEL IDENTIFIER | | | |
|---|---|---|---|---|
| | DESTINATION MAC ADDRESS | SENDER MAC ADDRESS | VLAN TAG ID | BSSID |
| 1 | S | X | #100 | A-1 |
| 2 | S | X | #200 | A-2 |
| 3 | S | X | #300 | A-3 |

AP CONTROL TUNNEL TABLE

| TUNNEL ID | TUNNEL IDENTIFIER | | TUNNEL GROUP IDENTIFIER |
|---|---|---|---|
| | DESTINATION MAC ADDRESS | SENDER MAC ADDRESS | |
| 1 | X | S | #1 |
| 2 | Y | S | #2 |
| .. | .. | .. | .. |

FIG.26B

DATA FRAME TUNNEL TABLE

| TUNNEL ID | TUNNEL IDENTIFIER | | TUNNEL GROUP IDENTIFIER |
|---|---|---|---|
| | DESTINATION MAC ADDRESS | SENDER MAC ADDRESS | |
| 1 | A-1 | S | #100 |
| 2 | A-2 | S | #200 |
| 3 | A-3 | S | #300 |
| 4 | B-1 | S | #200 |
| 5 | B-2 | S | #300 |
| 6 | B-3 | S | #100 |
| .. | .. | .. | .. |

FIG.26C

DATA FRAME CORRESPONDENCE TABLE

| index | TERMINAL IDENTIFIER | TUNNEL ID |
|---|---|---|
| 1 | T1 | 1 |
| 2 | T2 | 3 |
| 3 | T3 | 5 |
| 4 | T4 | 1 |
| 5 | T5 | 4 |
| 6 | T6 | 2 |
| .. | .. | .. |

FIG.26D

GROUP CORRESPONDENCE TABLE

| index | TERMINAL IDENTIFIER | TUNNEL GROUP IDENTIFIER |
|---|---|---|
| 1 | 1 | #100 |
| 2 | 2 | #200 |
| 3 | 3 | #300 |
| 4 | 4 | #400 |
| 5 | 5 | #500 |
| 6 | 6 | #600 |
| .. | .. | .. |

AP CONTROL TUNNEL TABLE

| TUNNEL ID | TUNNEL IDENTIFIER | | TUNNEL GROUP IDENTIFIER |
| --- | --- | --- | --- |
| | DESTINATION MAC ADDRESS | SENDER MAC ADDRESS | |
| 1 | S | X | #1 |

FIG.30A

DATA FRAME TUNNEL TABLE

| TUNNEL ID | TUNNEL IDENTIFIER | | TUNNEL GROUP IDENTIFIER |
| --- | --- | --- | --- |
| | DESTINATION MAC ADDRESS | SENDER MAC ADDRESS | |
| 1 | S | A-1 | #100 |
| 2 | S | A-2 | #200 |
| 3 | S | A-3 | #300 |

FIG.30B

AP CONTROL TUNNEL TABLE

| TUNNEL ID | TUNNEL IDENTIFIER | | |
|---|---|---|---|
| | DESTINATION MAC ADDRESS | SENDER MAC ADDRESS | VLAN TAG ID |
| 1 | X | S | #1 |
| 2 | Y | S | #2 |
| .. | .. | .. | .. |

FIG.35A

DATA FRAME TUNNEL TABLE

| TUNNEL ID | TUNNEL IDENTIFIER | | | | TUNNEL GROUP IDENTIFIER |
|---|---|---|---|---|---|
| | BSSID | DESTINATION MAC ADDRESS | SENDER MAC ADDRESS | VLAN TAG ID | |
| 1 | A-1 | X | S | #100 | #100 |
| 2 | A-2 | X | S | #200 | #200 |
| 3 | A-3 | X | S | #300 | #300 |
| 4 | B-1 | Y | S | #200 | #200 |
| 5 | B-2 | Y | S | #300 | #300 |
| 6 | B-3 | Y | S | #100 | #100 |
| .. | .. | .. | .. | .. | .. |

FIG.35B

DATA FRAME CORRESPONDENCE TABLE

| index | TERMINAL IDENTIFIER | TUNNEL ID |
|---|---|---|
| 1 | T1 | 1 |
| 2 | T2 | 3 |
| 3 | T3 | 5 |
| 4 | T4 | 1 |
| 5 | T5 | 4 |
| 6 | T6 | 2 |
| .. | .. | .. |

FIG.35C

GROUP CORRESPONDENCE TABLE

| index | NETWORK IDENTIFIER | TUNNEL GROUP IDENTIFIER |
|---|---|---|
| 1 | 1 | #100 |
| 2 | 2 | #200 |
| 3 | 3 | #300 |
| 4 | 4 | #400 |
| 5 | 5 | #500 |
| 6 | 6 | #600 |
| .. | .. | .. |

AP CONTROL TUNNEL TABLE

| TUNNEL ID | TUNNEL IDENTIFIER | | | TUNNEL GROUP IDENTIFIER |
|---|---|---|---|---|
| | DESTINATION MAC ADDRESS | SENDER MAC ADDRESS | VLAN TAG ID | |
| 1 | S | X | #1 | #1 |

FIG.37B

DATA FRAME CORRESPONDENCE TABLE

| TUNNEL ID | TUNNEL IDENTIFIER | | | BSSID | TUNNEL GROUP IDENTIFIER |
|---|---|---|---|---|---|
| | DESTINATION MAC ADDRESS | SENDER MAC ADDRESS | VLAN TAG ID | | |
| 1 | S | X | #100 | A-1 | #100 |
| 2 | S | X | #200 | A-2 | #200 |
| 3 | S | X | #300 | A-3 | #300 |

COMMUNICATION SYSTEM, RADIO LAN BASE STATION CONTROL DEVICE, AND RADIO LAN BASE STATION DEVICE

TECHNICAL FIELD

The present invention relates to a communication system, a wireless LAN base station control apparatus and a wireless LAN base station apparatus, and more particularly, to a communication system involving a wireless LAN and a wireless LAN base station control apparatus and a wireless LAN base station apparatus which make up the same.

BACKGROUND ART

In recent years, a wireless LAN (IEEE802.11 standard) is becoming widespread and a large-scale wireless LAN network system is being constructed in a public network and corporate network. Along with this, there are studies on a shift from a method of setting up access points (AP), for example, wireless LAN base station apparatuses individually, to a method whereby an AP control apparatus is connected to a plurality of wireless LAN base station apparatuses and this AP control apparatus, for example, a wireless LAN base station control apparatus carries out automatic settings, fault management and collection of statistical information or the like of the wireless LAN base station apparatuses collectively. These studies are underway by IETF (Internet Engineering Task Force) which is a global standardization organization and the IEEE802.11 working group or the like and this standardization is now being developed.

Consequently, there is a study on an architecture whereby bridge processing between a wireless LAN frame (802.11 standard) and an Ethernet (registered trademark) frame is carried out by not a wireless LAN base station apparatus, but a host AP control apparatus and a point where authentication ports are opened/closed is also transferred from a wireless LAN base station apparatus to an AP control apparatus. Concerning such architecture, in an IETF CAPWAP working group, an LWAPP (light weight access protocol) is proposed as one of protocols which manage APs. Under this LWAPP, an AP control apparatus performs control such as an automatic setting of setting information, fault management, collection of statistical information, setting of encryption key information on a wireless LAN base station apparatus or the like.

The communication systems proposed here define a communication using an Ethernet (registered trademark) tunnel between the AP control apparatus and the wireless LAN base station apparatus to perform such control (see Non-Patent Document 1). This Ethernet (registered trademark) tunnel is determined by a set of a sender MAC address and a destination MAC address. The LWAPP describes that the MAC address of the sender interface is set at the sender MAC address of the Ethernet (registered trademark) tunnel and the MAC address of the destination interface is set at the destination MAC address. Furthermore, when a plurality of MAC addresses are given to the sender interface, it depends on the implemention which MAC address is set.

In conventional communication systems, one MAC address is set for one interface of the AP control apparatus and the wireless LAN base station apparatus or the like and communications are carried out using the MAC address of this interface. Therefore, communications are carried out between the AP control apparatus and the wireless LAN base station apparatus using one data tunnel (for example, Ethernet (registered trademark) tunnels).

As a result, control frames which are exchanged between the AP control apparatus and the wireless LAN base station apparatus and data frames other than the control frames are handled by identical data tunnel.

Non-Patent Document 1: IETF draft draft-ohara-capwap-lwapp-00.txt "Light Weight Access Point Protocol"

DISCLOSURE OF INVENTION

Problems to be Solved by the Invention

However, in the conventional communication systems, control frames and data frames other than the control frames are handled by the identical data tunnel, and it is difficult to apply path control and QoS (Quality of Service) to be carried out inside one data tunnel on a network between the AP control apparatus and the wireless LAN base station apparatus.

Moreover, in the conventional communication system, control frames and data frames are communicated with equal priority, and when traffic of data frames increases, that is, causes congestion, control frames transmitted from the AP control apparatus to the wireless LAN base station apparatus do not arrive at the AP control apparatus and the AP control apparatus does not successfully manage the wireless LAN base station apparatus, which results in a problem that deterioration of the stability and safety of communications occurs in the communication system.

It is an object of the present invention to provide a communication system, a wireless LAN base station control apparatus and a wireless LAN base station apparatus capable of increasing a reliability of control between the wireless LAN base station control apparatus and wireless LAN base station apparatus and improving the stability and safety of communications.

Means for Solving the Problem

A first feature of the present invention is to provide a communication system comprising a wireless LAN base station apparatus and a wireless LAN base station control apparatus provided with a tunnel formation management section that forms a plurality of data tunnels therefrom to the wireless LAN base station apparatus and a control section that transmits data using different data tunnels according to the type of the transmission data.

A second feature of the present invention is to provide a wireless LAN base station control apparatus comprising a tunnel formation management section that forms a plurality of data tunnels and a control section that transmits data using different data tunnels according to the type of the transmission data.

A third feature of the present invention is to provide a wireless LAN base station apparatus comprising a tunnel formation management section that forms a plurality of data tunnels and a control section that transmits data using different data tunnels according to the type of the transmission data.

Advantageous Effect of the Invention

According to the present invention, a plurality of data tunnels is formed and different data tunnels is used according to the type of a frame, so that it is possible to provide a communication system, a wireless LAN base station control apparatus and a wireless LAN base station apparatus capable of increasing the reliability of control between the wireless LAN base station control apparatus and the wireless LAN base station apparatus and improving the stability and safety of communications.

BRIEF DESCRIPTION OF DRAWINGS

FIG. 4 illustrates tables held in a tunnel management database section in FIG. 3;

FIG. 7 illustrates tables held in a tunnel management database section in FIG. 6;

FIG. 19 illustrates tables held in a tunnel management database section in FIG. 18;

FIG. 20 illustrates the configuration of an AP control frame and a data frame;

FIG. 22 illustrates tables held in a tunnel management database section in FIG. 21;

FIG. 26 illustrates tables held in a tunnel management database section in FIG. 25;

FIG. 30 illustrates tables held in a tunnel management database section in FIG. 29;

FIG. 35 illustrates tables held in a tunnel management database section in FIG. 34;

FIG. 37 illustrates tables held in a tunnel management database section in FIG. 36.

BEST MODE FOR CARRYING OUT THE INVENTION

Figure 1:
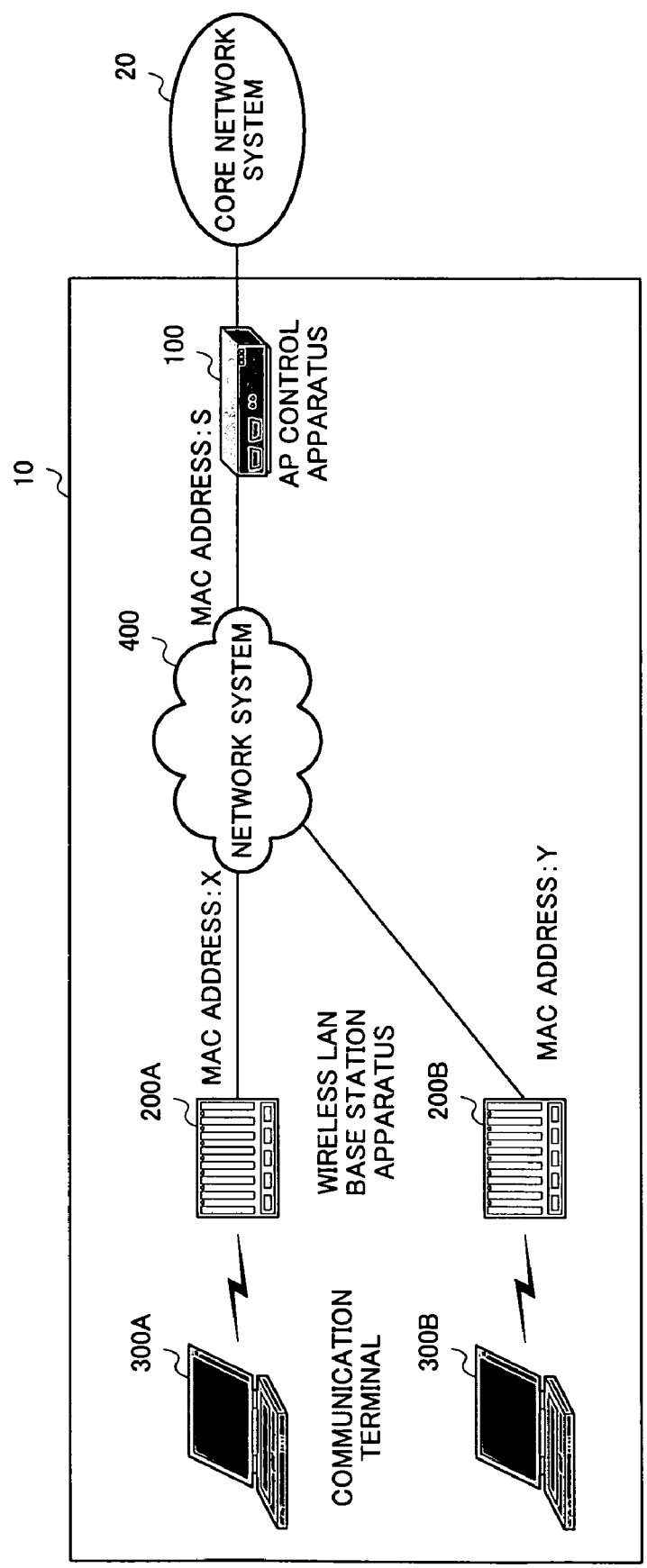
FIG. 1 is an overall configuration diagram of a communication system according to Embodiment 1 of the present invention.

Now, embodiments of the present invention will be described in detail with reference to the accompanying drawings. In the respective embodiments, the same components are assigned the same reference numerals and overlapping descriptions thereof will be omitted.

Embodiment 1

First, the configuration of the communication system according to this embodiment will be described with reference to FIG. 1.

As shown in FIG. 1, communication system 10 according to Embodiment 1 is provided with wireless LAN base station apparatus 200, AP control apparatus 100 that forms data tunnels determined or defined by the base station MAC address of wireless LAN base station apparatus 200 and the own control station MAC address and communicates using these data tunnels as a wireless LAN base station control apparatus, communication terminal 300 that accesses wireless LAN base station apparatus 200 to communicate therewith and network system 400. AP control apparatus 100 is connected to core network system 20.

The interface on the wireless LAN base station apparatus 200 side of AP control apparatus 100 is assigned a MAC address: S. On the other hand, the interface on the AP control apparatus 100 side of wireless LAN base station apparatus 200A is assigned a MAC addresses: X. Communications are carried out between AP control apparatus 100 and wireless LAN base station apparatus 200A through a data tunnel defined by the MAC address: X and the MAC address: S. On the other hand, communications are carried out between AP control apparatus 100 and wireless LAN base station apparatus 200B through a data tunnel defined by a MAC address: Y and the MAC address: S.

Furthermore, communications are carried out between wireless LAN base station apparatus 200A and communication terminal 300A using a BSSID (Basic Service Set ID): A as an identifier. Communications are carried out between wireless LAN base station apparatus 200B and communication terminal 300B using a BSSID (Basic Service Set ID): B as an identifier.

This embodiment allows additional n data tunnels to be formed between wireless LAN base station apparatus 200A and AP control apparatus 100.

Figure 2:
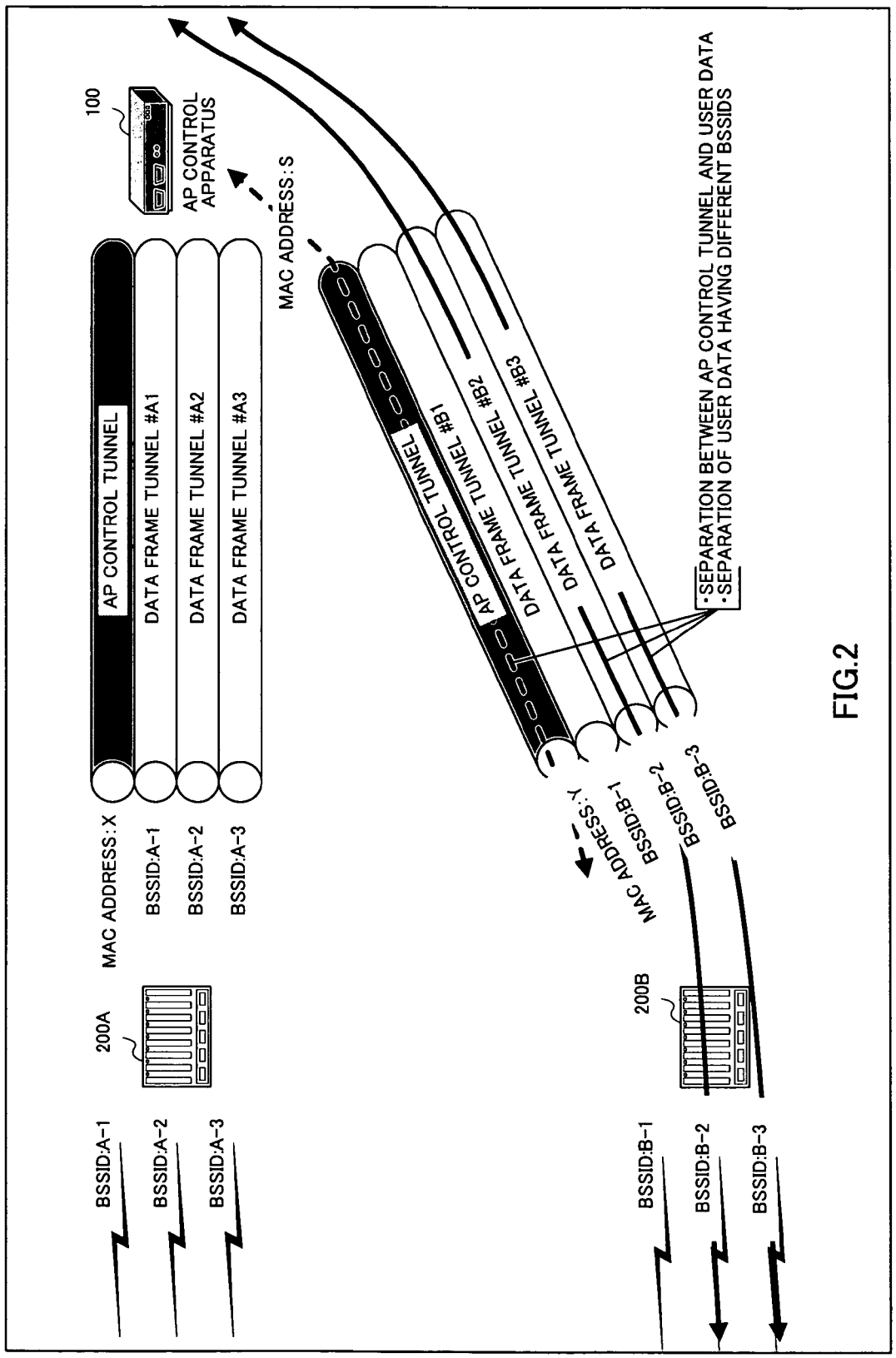
FIG. 2 illustrates data tunnels formed between an AP control apparatus and a wireless LAN base station apparatus in FIG. 1.

More specifically, as shown in FIG. 2, this embodiment allows additional three data tunnels (data frame tunnels #A1 to A3) to be formed between wireless LAN base station apparatus 200A and AP control apparatus 100 by assuming BSSIDs: A-1 to n provided to carry out communications between wireless LAN base station apparatus 200A and communication terminates 300A-1 to n (n=3 in FIG. 2, hereinafter described as n=3) as base station identification information to identify wireless LAN base station apparatus 200A and assigning BSSIDs: A-1 to 3 assumed as the base station identification information to the interface on the AP control apparatus 100 side of wireless LAN base station apparatus 200A. Also, with regard to wireless LAN base station apparatus 200B, it is possible to form additional three data tunnels (data frame tunnels #B1 to B3) between wireless LAN base station apparatus 200B and AP control apparatus 100 by assigning BSSIDs: B-1 to 3 assumed as base station identification information to the interface on the AP control apparatus 100 side of wireless LAN base station apparatus 200B.

Furthermore, this embodiment carries out communications using different data tunnels for a control frame and data frames other than the control frame exchanged between AP control apparatus 100 and wireless LAN base station apparatus 200.

More specifically, a control frame is communicated between AP control apparatus 100 and wireless LAN base station apparatus 200A through a data tunnel which is determined or defined by the MAC address: X and the MAC address: S. Furthermore, data frames other than the control frame are communicated through three data tunnels (data frame tunnels #A1 to A3) defined by BSSIDs: A-1 to 3 and the MAC address: S. The configurations of the control frame (hereinafter, referred to as an "AP control frame") for the control of wireless LAN base station apparatus 200 by AP control apparatus 100 and data frames exchanged between AP control apparatus 100 and wireless LAN base station apparatus 200 will be described later.

In this way, it is possible to form a plurality of data tunnels between AP control apparatus 100 and wireless LAN base station apparatus 200 in communication system 10 and also use different of the data tunnels according to the type of frame (control frame and data frame other than the control frame or the like).

This enables to eliminate the inconvenience that the AP control frame which is transmitted from AP control apparatus 100 to wireless LAN base station apparatus 200 does not arrive at AP control apparatus 100 or that management of wireless LAN base station apparatus 200 by AP control apparatus 100 is not successfully performed, which may occur when traffic of data frames increases, that is, in the event of congestion. Furthermore, the AP control frame and data frames are communicated through different data tunnels so that it is possible to apply QoS and path selection or the like for each frame.

Figure 3:
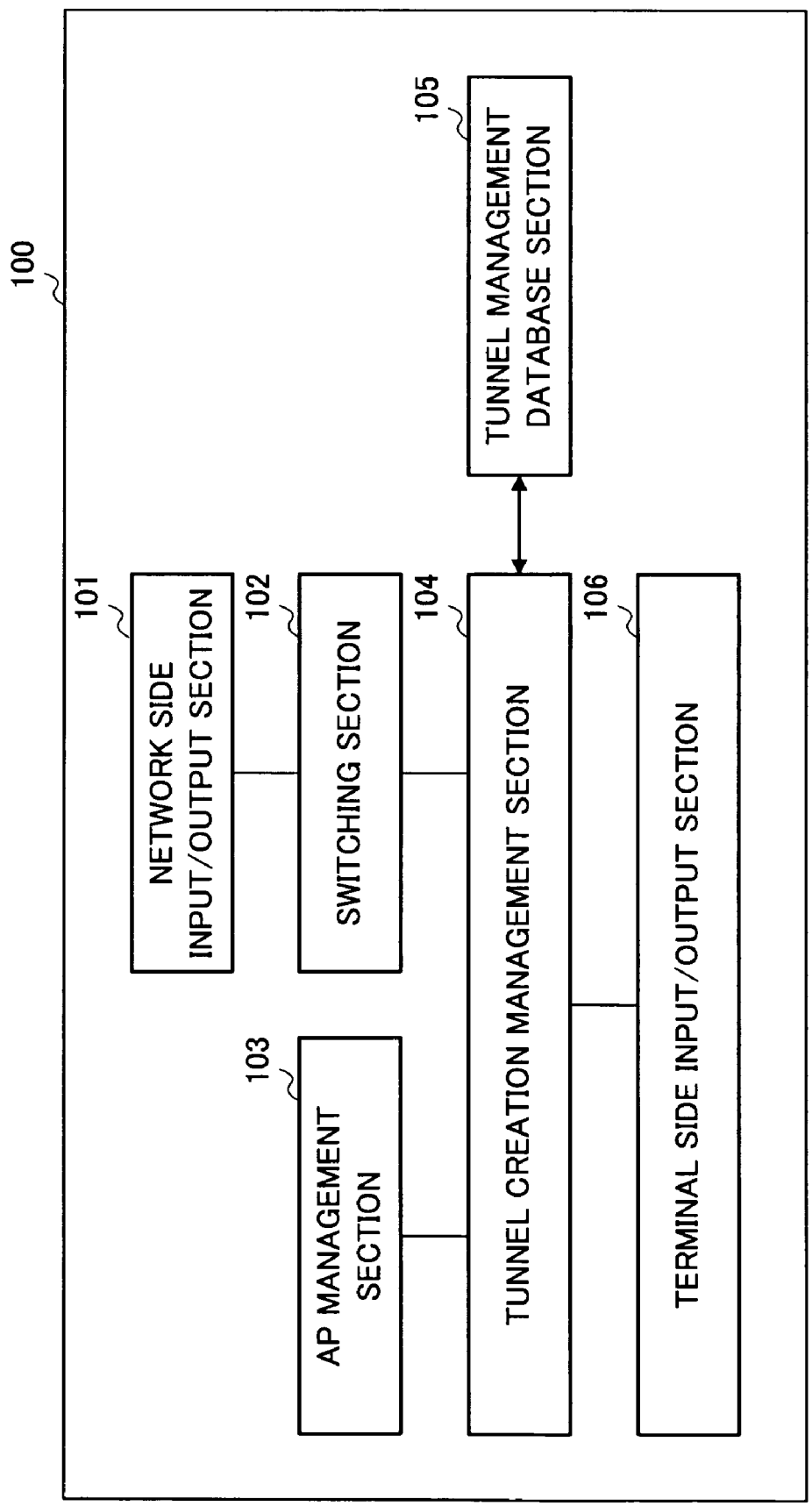
FIG. 3 is a block diagram showing the configuration of an AP control apparatus in FIG. 1.

As shown in FIG. 3, AP control apparatus 100 is provided with network side input/output section 101, switching section 102, AP management section 103, tunnel creation management section 104 as a tunnel formation management section that forms a first one of the data tunnels (which passes a control frame) and a second one of the data tunnels (which passes data frames other than the control frame) and as a control section that transmits, when transmission data is control data, the control data using the first one of the data tunnels and transmits, when the transmission data is other than the control data, the data using the second one of the data tunnels, tunnel management database section 105 as a storage section that stores base station MAC addresses, base station identification information and control station MAC address in correspondence with each other and terminal side input/output section 106.

Network side input/output section 101 inputs/outputs a frame to/from the network side, that is, the core network system 20 side. More specifically, it sends out a frame input from the core network system 20 side to switching section 102 and sends out a frame input from switching section 102 to core network system 20.

Switching section 102 switches a frame input to any one of the network side and the terminal side. More specifically, switching section 102 sends out a frame input to network side input/output section 101 or tunnel creation management section 104.

AP management section 103 performs processing for managing wireless LAN base station apparatus 200. More specifically, it generates an AP control frame to control wireless LAN base station apparatus 200 and sends it out to tunnel creation management section 104.

Tunnel creation management section 104 creates data tunnels and manages tunnel management database section 105 or the like. Furthermore, tunnel creation management section 104 distributes frames input to different data tunnels. The details of the operation of this tunnel creation management section 104 will be described later.

Tunnel management database section 105 is provided with an AP control tunnel table, data frame tunnel table and data frame correspondence table as shown in FIG. 4.

As shown in FIG. 4A, the AP control tunnel table includes entries of data tunnels to communicate control frames and each data tunnel is defined (specified) by a set of a destination MAC address and a sender MAC address. For example, tunnel ID 1 of the AP control tunnel table in FIG. 4A defines the AP control tunnel formed between AP control apparatus 100 and wireless LAN base station apparatus 200A shown in FIG. 2.

As shown in FIG. 4B, the data frame tunnel table includes entries of data tunnels to communicate data frames and each data tunnel is defined (specified) by a set of a destination MAC address and a sender MAC address. For example, tunnel ID 1 of the data frame tunnel table in FIG. 4B defines data frame tunnel #A1 formed between AP control apparatus 100 and wireless LAN base station apparatus 200A shown in FIG. 2. Here, BSSIDs are used as the MAC addresses of wireless LAN base station apparatus 200.

In this way, a BSSID used for a communication between communication terminal 300 and wireless LAN base station apparatus 200 is used as the MAC address on the AP control apparatus 100 side of wireless LAN base station apparatus 200 as is, and therefore once a BSSID assigned to communication terminal 300 is determined, a data tunnel through which data frames transmitted/received to/from communication terminal 300 pass is uniquely determined. That is, a data tunnel which goes from communication terminal 300 through wireless LAN base station apparatus 200 to AP control apparatus 100 is formed. Therefore, once a data tunnel is defined (specified), mediating wireless LAN base station apparatus 200 need not carry out heavy processing for transferring data frames, which reduces the amount of processing at wireless LAN base station apparatus 200. Furthermore, even with communication terminal 300 which is accommodated in identical wireless LAN base station apparatus 200, when the assigned BSSID is different, the data tunnel to be used is also different, and therefore it is possible to apply QoS and path control to each communication terminal 300 to/from which data frames are transmitted/received.

As shown in FIG. 4C, the data frame correspondence table defines (specifies) which data tunnel is used for each data frame. If, for example, a terminal identifier of communication terminal 300A is T1, the table defines (specifies) that the data tunnel with tunnel ID 1 of the data frame tunnel table is used when data frames are exchanged between communication terminal 300A and AP control apparatus 100. That is, as for the use of a data frame tunnel, a data tunnel which is uniquely determined for each BSSID assigned to communication terminal 300 communicating with AP control apparatus 100 through wireless LAN base station apparatus 200 is used, and therefore an identifier (for example, the MAC address of communication terminal 300) of communication terminal 300 is associated with one entry of the data frame tunnel table.

Next, the operation of tunnel creation management section 104 will be described with reference to FIG. 5.

First, upon receiving a frame in step ST2001, tunnel creation management section 104 judges from where the frame has been received (step ST2002).

When judging in step ST2002 that the frame has been received from switching section 102 or AP management section 103, tunnel creation management section 104 judges whether the frame is a data frame or an AP control frame (step ST2003).

When judging in step ST2003 that the frame is a data frame, tunnel creation management section 104 searches through the data frame correspondence table using the destination MAC address (terminal identifier) of communication terminal 300 included in the frame as a key and extracts the corresponding tunnel ID (step ST2004).

In step ST2005, tunnel creation management section 104 then searches through the data frame tunnel table using the tunnel ID extracted in step ST2004 as a key and extracts the corresponding tunnel identifier, that is, the destination MAC address and sender MAC address.

In step ST2006, tunnel creation management section 104 creates a tunnel header based on the tunnel identifier extracted in step ST2005 or in step ST2007 which will be described later, includes it in the data frame as the header, that is, encapsulates it and sends it out to terminal side input/output section 106.

When judging in step ST2003 that the frame is an AP control frame, tunnel creation management section 104 searches through the AP control tunnel table using the MAC address of wireless LAN base station apparatus 200 which is included in the AP control frame and which is a control target as a key and extracts a tunnel identifier (step ST2007).

When judging in step ST2002 that the frame has been received from terminal side input/output section 106, tunnel creation management section 104 inspects the tunnel header of the received frame (step ST2008) and removes the tunnel header, that is, decapsulates it (step ST2009).

In step ST2010, tunnel creation management section 104 then judges whether the decapsulated frame is a data frame or control frame.

When the judgement result in step ST2010 shows that the frame is a data frame, tunnel creation management section 104 searches the corresponding tunnel ID from the data frame tunnel table using the sender MAC address (the MAC address of communication terminal 300 here) included in the data frame as a key and stores the tunnel ID in correspondence with a terminal identifier (MAC address of communication terminal 300) in data frame correspondence table (step ST2011).

Tunnel creation management section 104 sends out the data frame to switching section 102 (step ST2012).

When the judgement result in step ST2010 shows that the frame is a control frame from wireless LAN base station apparatus 200, tunnel creation management section 104 sends out the control frame to AP management section 103 (step ST2013).

Terminal side input/output section 106 then sends out the frame received from tunnel creation management section 104 to wireless LAN base station apparatus 200 and also sends out the frame from wireless LAN base station apparatus 200 to tunnel creation management section 104.

Figure 6:
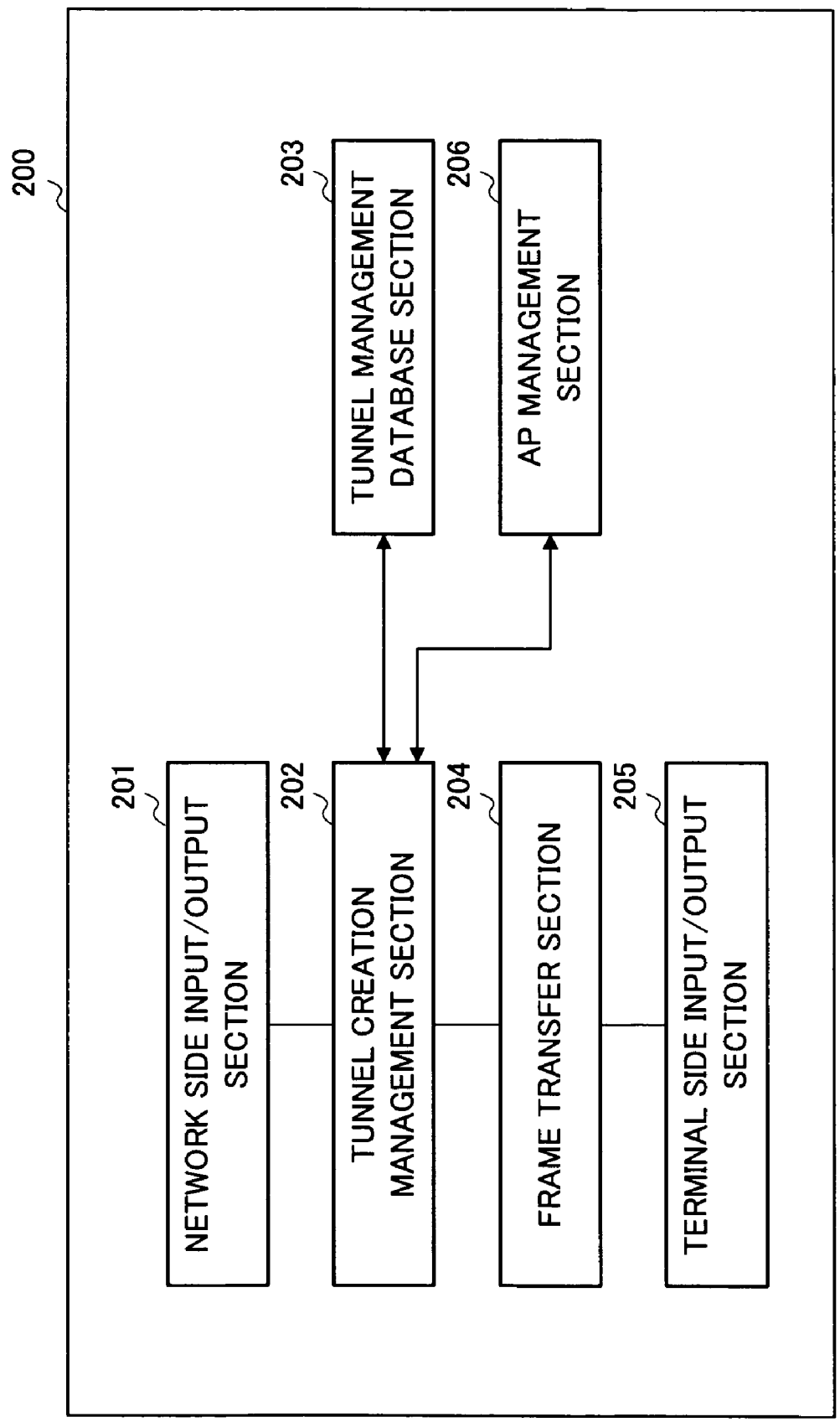
FIG. 6 is a block diagram showing the configuration of a wireless LAN base station apparatus in FIG. 1.

Next, as shown in FIG. 6, wireless LAN base station apparatus 200 is provided with network side input/output section 201, tunnel creation management section 202 as a tunnel formation management section that forms and manages a first one of the data tunnels (which passes a control frame) and a second one of the data tunnels (which passes data frames other than the control frame) and as a control section that transmits, when the transmission data is control data, the control data using the first one of the data tunnels and transmits, when the transmission data is data other than the control data, the data using the second one of the data tunnels, tunnel management database section 203 as a storage section that stores the base station MAC address in correspondence with base station identification information and control station MAC address, frame transfer section 204, terminal side input/output section 205 and AP management section 206.

Network side input/output section 201 inputs/outputs a frame to/from the network side, that is, the AP control apparatus 100 side. More specifically, network side input/output section 201 sends out a frame input from the AP control apparatus 100 side to tunnel creation management section 202 and also sends out a frame input from tunnel creation management section 202 to AP control apparatus 100.

Tunnel creation management section 202 creates data tunnels and manages tunnel management database section 203 or the like. Furthermore, tunnel creation management section 202 distributes frames input to different data tunnels. The details of the operation of the tunnel creation management section 202 will be described later.

Tunnel management database section 203 is provided with an AP control tunnel table and a data frame tunnel table as shown in FIG. 7.

As shown in FIG. 7A, the AP control tunnel table includes entries of a data tunnel to communicate a control frame and the data tunnel is defined by a set of a destination MAC address and a sender MAC address. One AP control tunnel is generally formed for one wireless LAN base station apparatus 200, and the AP control tunnel table managed by tunnel management database section 203 includes one set of entries.

As shown in FIG. 7B, the data frame tunnel table includes entries of data tunnels to communicate data frames and each data tunnel is defined by a set of a destination MAC address and a sender MAC address. For example, tunnel ID 1 of the data frame tunnel table in FIG. 7B defines data frame tunnel #A1 which is formed between AP control apparatus 100 and wireless LAN base station apparatus 200A shown in FIG. 2. Here, BSSIDs are also used as the MAC addresses of wireless LAN base station apparatus 200.

Frame transfer section 204 performs appropriate protocol processing on the frame received from tunnel creation management section 202 and sends out the frame after the protocol processing to terminal side input/output section 205. Furthermore, frame transfer section 204 performs appropriate protocol processing on the frame received from terminal side input/output section 205 and sends out the frame after the protocol processing to tunnel creation management section 202.

Terminal side input/output section 205 sends out a frame from communication terminal 300 to frame transfer section 204 and also sends out a frame from frame transfer section 204 to communication terminal 300.

AP management section 206 performs processing for managing the own apparatus, that is, wireless LAN base station apparatus 200. More specifically, it receives a control frame to control wireless LAN base station apparatus 200 from AP control apparatus 100 (hereinafter, referred to as an "AP control frame"), manages the own apparatus, generates a control frame to be sent out to AP control apparatus 100 in response to the AP control frame and sends it out to tunnel creation management section 202.

Next, the operation of tunnel creation management section 202 will be described with reference to FIG. 8. First, upon receiving a frame in step ST2101, tunnel creation management section 202 judges from where the frame has been received (step ST2102).

When judging in step ST2102 that the frame has been received from frame transfer section 204 or AP management section 206, tunnel creation management section 202 judges whether the frame is a data frame or a control frame (step ST2103).

When judging in step ST2103 that the frame is a data frame, tunnel creation management section 202 acquires a BSSID included in the frame (step ST2104). The BSSID is stored in Add1 of 802.11 header.

In step ST2105, tunnel creation management section 202 searches through the data frame tunnel table using the BSSID extracted in step ST2104 as a key and extracts a tunnel identifier in which the sender MAC address which corresponds to this BSSID is stored, that is, the destination MAC address and sender MAC address.

In step ST2106, tunnel creation management section 202 creates a tunnel header based on the tunnel identifier extracted in step ST2105 or step ST2107 which will be described later, includes it in the frame as the header, that is, encapsulates it and sends it out to network side input/output section 201.

When judging in step ST2103 that the frame is a control frame, tunnel creation management section 202 searches through the AP control tunnel table using the MAC address of AP control apparatus 100 which is included in the control frame and which is a delivery target as a key and extracts a tunnel identifier (step ST2107).

When judging in step ST2102 that the frame has been received from network side input/output section 201, tunnel creation management section 202 inspects the tunnel header of the received frame (step ST2108) and removes a tunnel header, that is, decapsulates it (step ST2109).

Then, tunnel creation management section 202 judges in step ST2110 whether or not the decapsulated frame is a data frame or an AP control frame.

When the judgement result in step ST2110 shows that the frame is a data frame, tunnel creation management section 202 sends out the data frame to frame transfer section 204 (step ST2111).

When the judgement result in step ST2110 shows that the frame is an AP control frame from AP control apparatus 100, tunnel creation management section 202 sends out the AP control frame to AP management section 206 (step ST2112).

Figure 9:
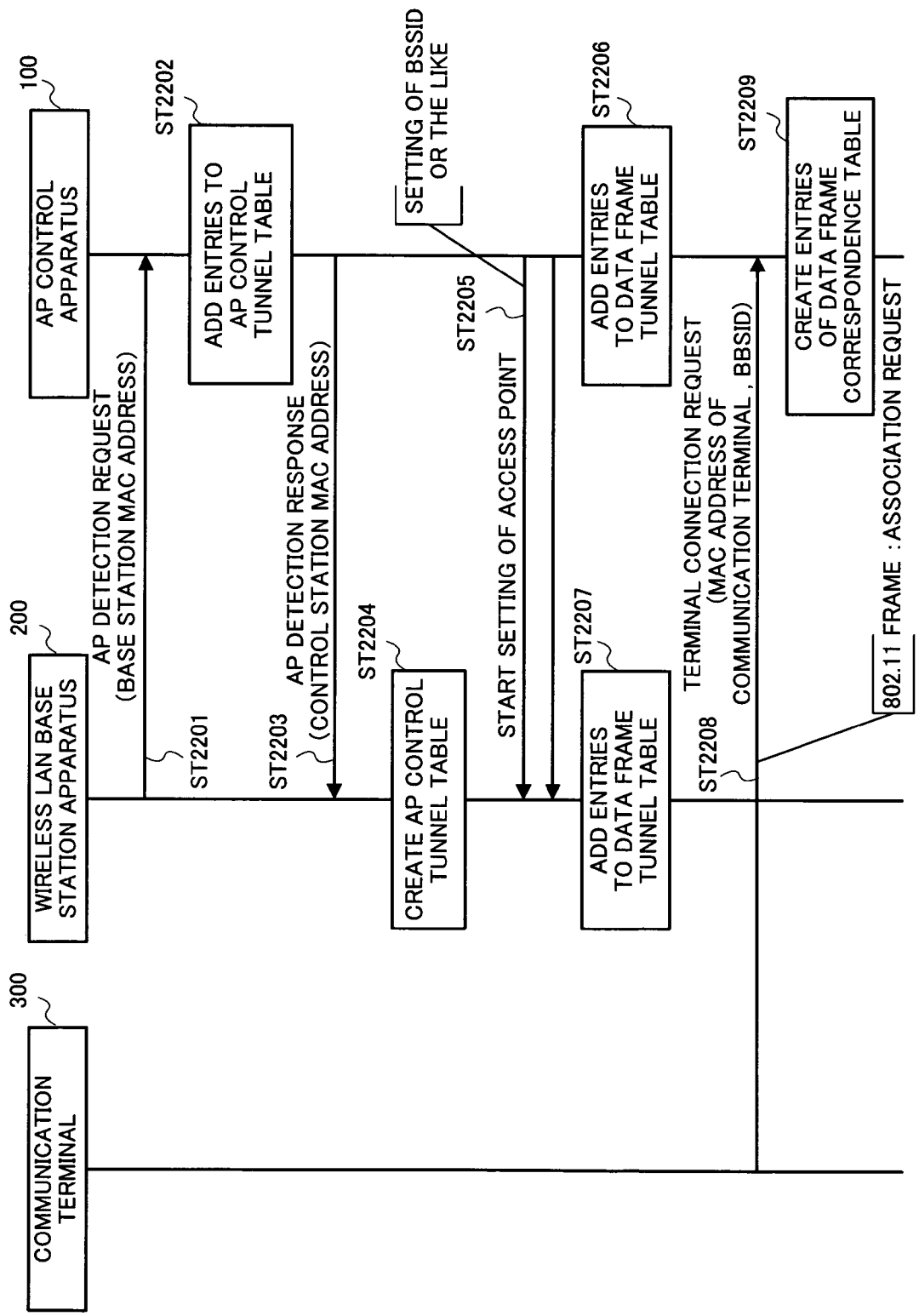
FIG. 9 is a sequence diagram illustrating tunnel creation carried out in a communication system in FIG. 1.

Next, the tunnel creating sequence carried out by communication system 10 will be described with reference to FIG. 9.

In step ST2201, wireless LAN base station apparatus 200 sends out an AP detection request including the base station MAC address of the own apparatus (more specifically, MAC address of the AP connection port) to AP control apparatus 100 to have AP control apparatus 100 detect the own apparatus first.

Figure 10:
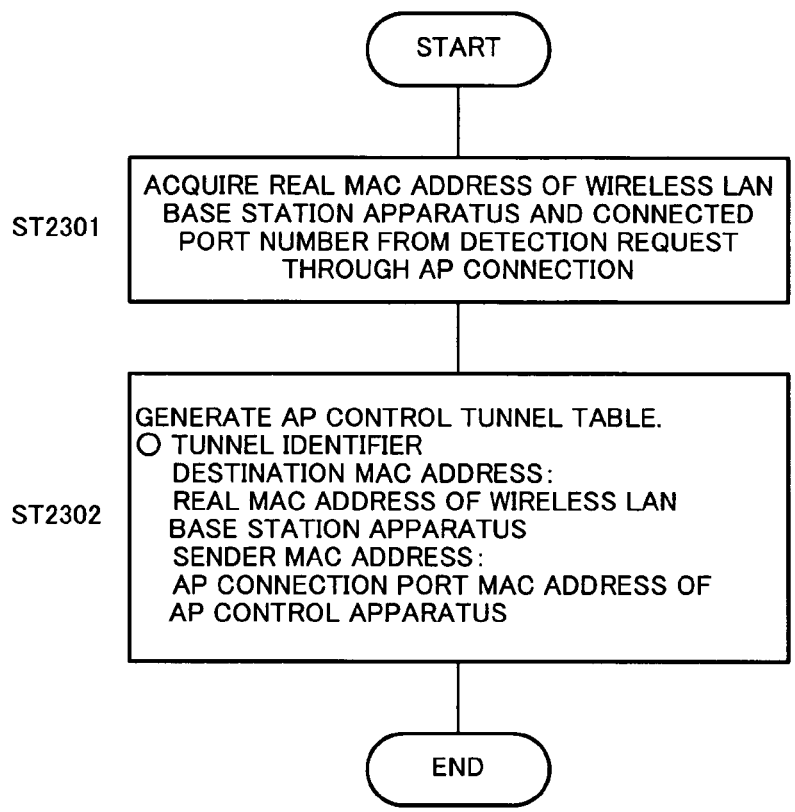
FIG. 10 is a flow chart illustrating details of steps in the sequence diagram in FIG. 9.

In step ST2202, AP control apparatus 100 performs processing for adding entries to the AP control tunnel table based on the AP detection request received from wireless LAN base station apparatus 200. More specifically, as shown in FIG. 10, in AP control apparatus 100, tunnel creation management section 104 acquires the real MAC address of wireless LAN base station apparatus 200 and the port number of the connected wireless LAN base station apparatus 200 from the AP detection request received through terminal side input/output section 106 (step ST2301). Tunnel creation management section 104 generates an AP control tunnel table of tunnel management database section 105 based on the information acquired in step ST2301 (step ST2302). More specifically, the real MAC address of wireless LAN base station apparatus 200 is input as the destination MAC address of the tunnel identifier in the AP control tunnel table and the MAC address of the AP connection port of the own apparatus, that is, AP control apparatus 100 is input as the sender MAC address of the tunnel identifier.

In step ST2203, AP control apparatus 100 sends out an AP detection response including the control station MAC address of the own apparatus to wireless LAN base station apparatus 200.

Figure 11:
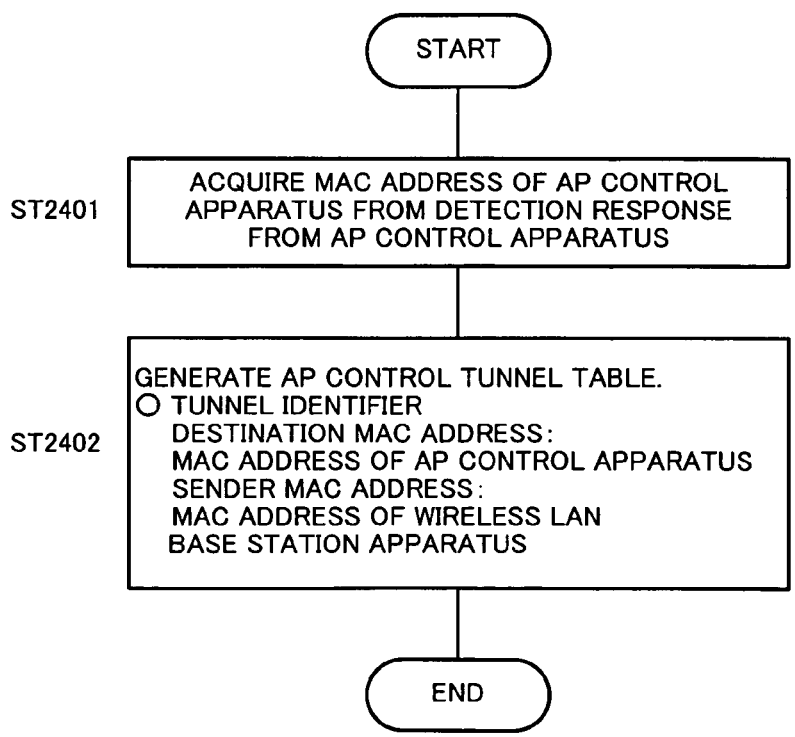
FIG. 11 is a flow chart illustrating details of steps in the sequence diagram in FIG. 9.

In step ST2204, wireless LAN base station apparatus 200 creates an AP control tunnel table based on the AP detection response received from AP control apparatus 100. More specifically, as shown in FIG. 11, in wireless LAN base station apparatus 200, tunnel creation management section 202 acquires the MAC address of AP control apparatus 100 from the AP detection response received through network side input/output section 201 (step ST2401). Then, tunnel creation management section 202 generates an AP control tunnel table based on the information acquired in step ST2401 (step ST2402). More specifically, the MAC address of AP control apparatus 100 is input as the destination MAC address of the tunnel identifier in the AP control tunnel table and the MAC address of the own apparatus, that is, wireless LAN base station apparatus 200 is input as the sender MAC address of the tunnel identifier. At this point, an AP control tunnel is set up between AP control apparatus 100 and wireless LAN base station apparatus 200.

In step ST2205, AP control apparatus 100 is setting wireless LAN base station apparatus 200. More specifically, it sets a BSSID which is used for a communication between wireless LAN base station apparatus 200 and communication terminal 300 or the like.

Then, the same number of entired as BSSIDs set in step ST2205 are added to the data frame tunnel table of AP control apparatus 100 and wireless LAN base station apparatus 200.

Figure 12:
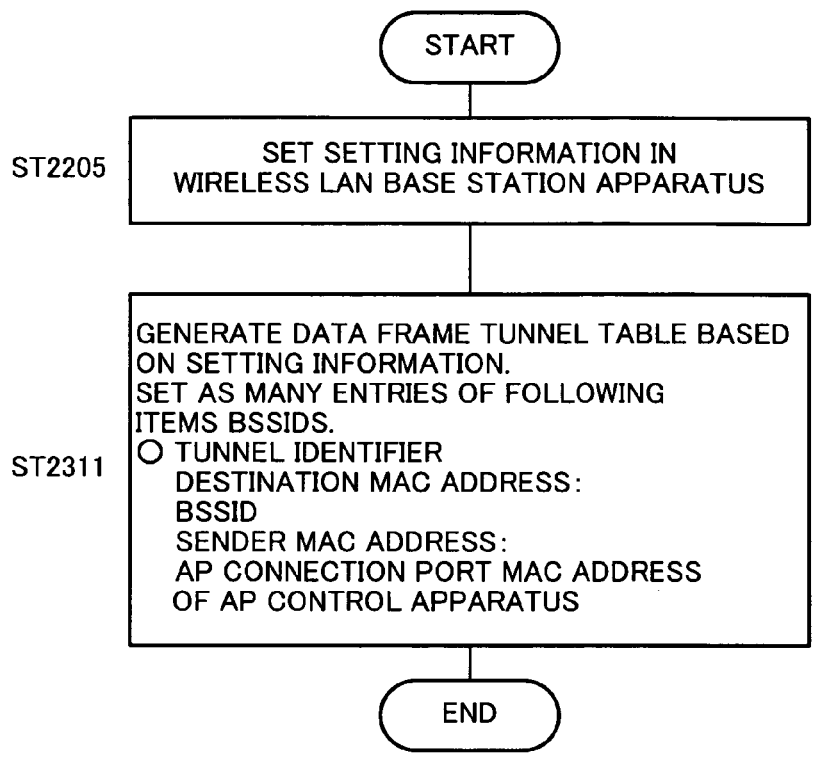
FIG. 12 is a flow chart illustrating details of steps in the sequence diagram in FIG. 9.

In other words, in step ST2206, AP control apparatus 100 adds entries of the data frame tunnel table. More specifically, as shown in FIG. 12, AP control apparatus 100 makes a setting on wireless LAN base station apparatus 200 in step ST2205 and generates a data frame tunnel table based on the setting information (step ST2311). More specifically, BSSID included in the setting information is input as the destination MAC address of the tunnel identifier in the data frame tunnel table and the AP connection port MAC address of AP control apparatus 100 is input as the sender MAC address of the tunnel identifier. The same number of entries as BSSIDs to be set is added.

Figure 13:
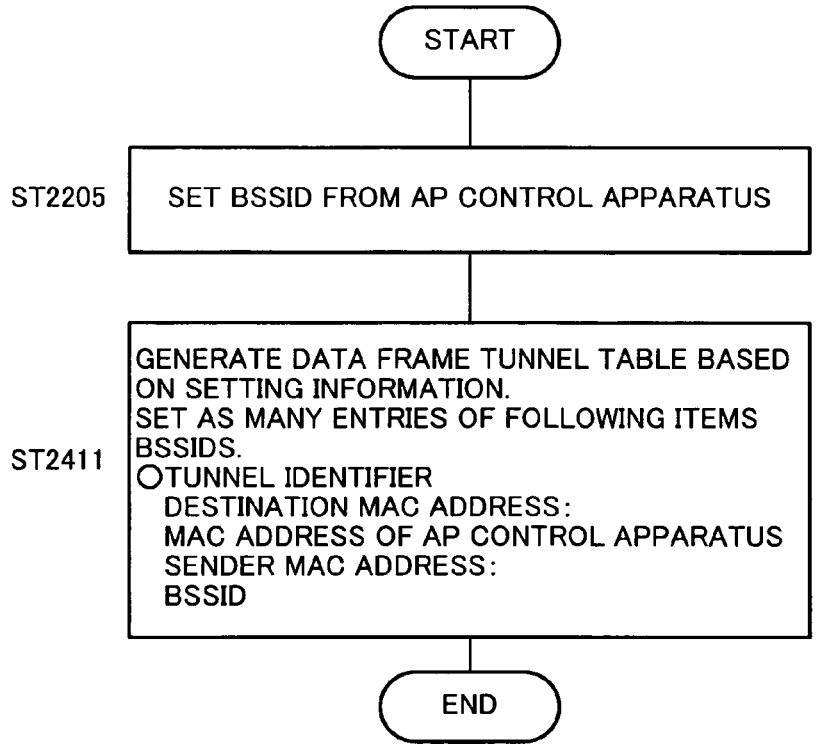
FIG. 13 is a flow chart illustrating details of steps in the sequence diagram in FIG. 9.

In step ST2207, wireless LAN base station apparatus 200 adds entries of the data frame tunnel table. More specifically, as shown in FIG. 13, as for wireless LAN base station apparatus 200, AP control apparatus 100 makes the setting in step ST2205 and generates a data frame tunnel table based on the setting information (step ST2411). More specifically, the MAC address of AP control apparatus 100 which has been added to the setting information is input as the destination MAC address of the tunnel identifier in the data frame tunnel table and a BSSID included in the setting information is input as the sender MAC address of the tunnel identifier. At this point, a data frame tunnel is set up between AP control apparatus 100 and wireless LAN base station apparatus 200.

When communication terminal 300 sends a connection request to wireless LAN base station apparatus 200, wireless LAN base station apparatus 200 assigns one BSSID to communication terminal 300, includes the MAC address of communication terminal 300 and the BSSID assigned to communication terminal 300 in the connection request from communication terminal 300 and sends them out to AP control apparatus 100 (step ST2208).

Figure 14:
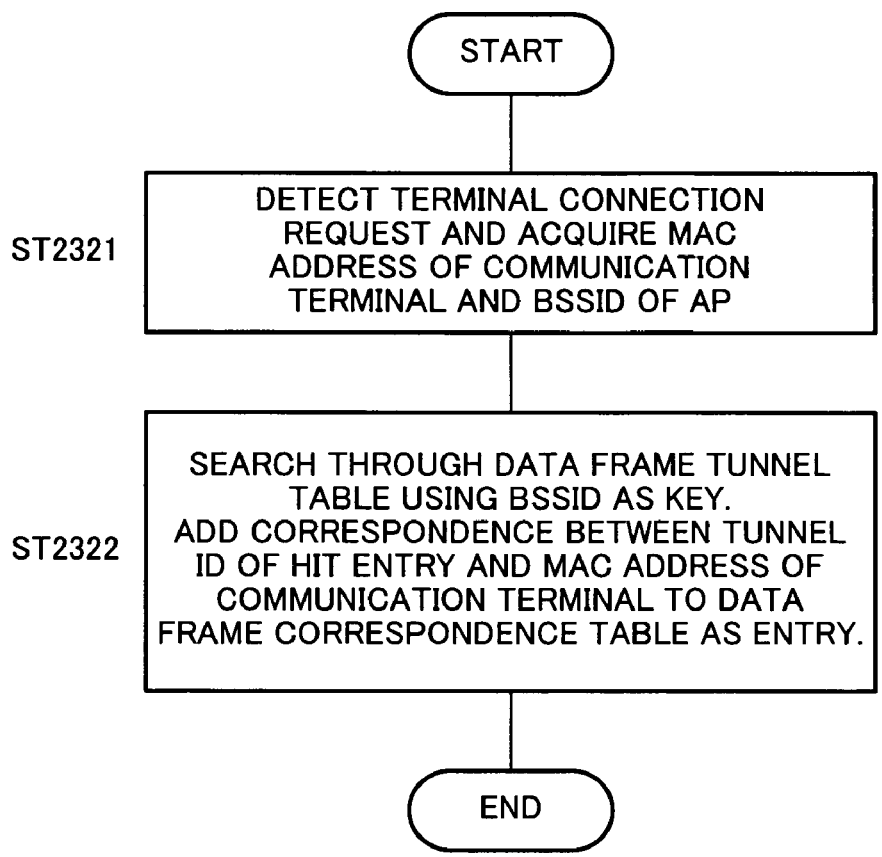
FIG. 14 is a flow chart illustrating details of steps in the sequence diagram in FIG. 9.

In step ST2209, AP control apparatus 100 creates a data frame tunnel table of tunnel management database section 203 based on the connection request of communication terminal 300 received from wireless LAN base station apparatus 200. More specifically, as shown in FIG. 14, AP control apparatus 100 detects the connection request and acquires the MAC address and BSSID of communication terminal 300 included in the connection request (step ST2321). Then, tunnel creation management section 104 of AP control apparatus 100 searches through the data frame tunnel table using the BSSID acquired in step ST2321 as a key and acquires the tunnel ID of the entry which has the destination MAC address identical to the BSSID. Tunnel creation management section 104 then adds the acquired tunnel ID and the MAC address acquired in step ST2321 to the data frame correspondence table of tunnel management database section 105 as entries (step ST2322).

Figure 15:
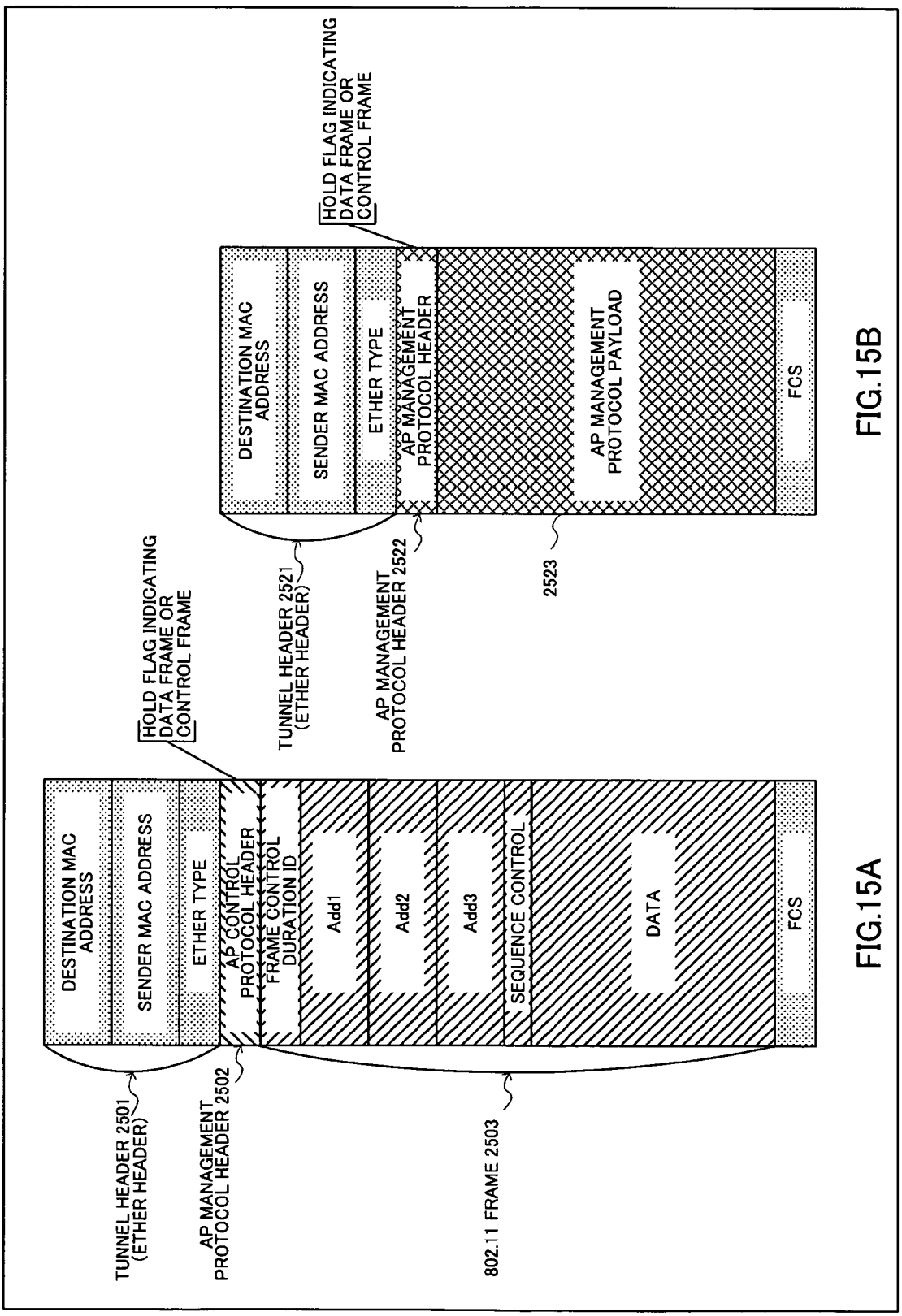
FIG. 15 illustrates the configuration of an AP control frame and a data frame.

Next, the configuration of an AP control frame for control of wireless LAN base station apparatus 200 by AP control apparatus 100 and a data frame exchanged between AP control apparatus 100 and wireless LAN base station apparatus 200 will be described with reference to FIG. 15.

As shown in FIG. 15A, the data frame is provided with tunnel header 2501 (here, Ether header), AP management protocol header 2502 and 802.11 frame 2503. Tunnel header 2501 consists of a destination MAC address, a sender MAC address and an Ether type. On the other hand, AP management protocol header 2502 stores a flag which indicates whether a frame is a control frame or a data frame. 802.11 frame 2503 consists of a frame control duration ID, an address 1 area (Add1) which stores a BSSID, an address 2 area (Add2) which holds the MAC address of communication terminal 300, an address 3 area (Add3) which stores the destination MAC address, a sequence control area and a data area. The information stored at above addresses 1 to 3 corresponds to an explanation of a case where the information is transmitted in the direction from communication terminal 300 to AP control apparatus 100.

As shown in FIG. 15B, the AP control frame is provided with tunnel header (Ether header here) 2521, AP management protocol header 2522 and AP management protocol payload 2523. Tunnel header 2521 consists of a destination MAC address, a sender MAC address and an Ether type. AP management protocol header 2522 holds a flag indicating whether a frame is a data frame or a control frame.

In this way, communication system 10 according to Embodiment 1 forms a plurality of data tunnels between AP control apparatus 100 and wireless LAN base station apparatus 200 and uses different data tunnels according to the type of the frame (control data frame, data frame or the like), thereby increases the reliability that an AP control frame arrives at wireless LAN base station apparatus 200, consequently increases the reliability of control between AP control apparatus 100 and wireless LAN base station apparatus 200, and can thereby improve the stability and safety of communications in communication system 10.

Furthermore, communication system 10 according to Embodiment 1 also uses a BSSID used for a communication between communication terminal 300 and wireless LAN base station apparatus 200 as the base station identification information (for example, the MAC address) on the AP control apparatus 100 side of wireless LAN base station apparatus 200 as is, and therefore once a BSSID assigned to communication terminal 300 is determined, a data tunnel through which a data frame sent and received to/from communication terminal 300 pass is uniquely determined. That is, a data tunnel which goes from communication terminal 300 through wireless LAN base station apparatus 200 to AP control apparatus 100 is formed. Therefore, once a data tunnel is defined, mediating wireless LAN base station apparatus 200 need not perform heavy processing for transferring the data frame, and therefore the amount of processing at wireless LAN base station apparatus 200 is reduced. Furthermore, even in the case of communication terminal 300 which is accommodated in identical wireless LAN base station apparatus 200, if the assigned BSSID is different, the data tunnel to be used is also different, and therefore it is possible to apply QoS and path control to each communication terminal 300 to/from which a data frame is transmitted/received.

As described above, according to Embodiment 1, AP control apparatus 100 is provided with tunnel creation management section 104 as the tunnel formation management section that forms a plurality of data tunnels and as the control section that transmits data using different data tunnels according to the type of the transmission data.

By this means, for example, by using different data tunnels for control data and for data other than the control data, the reliability that the control data arrives at the destination increases and consequently the reliability of the control between AP control apparatus 100 and wireless LAN base station apparatus 200 increases. Therefore, it is possible to improve the stability and safety of communications.

In addition to the first one of the data tunnels defined by the base station MAC address of wireless LAN base station apparatus 200 and the control station MAC address of the own apparatus, tunnel creation management section 104 forms a second one of the data tunnels by the base station identification information of wireless LAN base station apparatus 200 other than the base station MAC address and the control station MAC address. As this base station identification information, for example, a BSSID is used.

In this way, by using a BSSID assigned to a communication terminal which communicates with wireless LAN base station apparatus 200 as the base station identification information (for example, MAC address) on the AP control apparatus 100 side of wireless LAN base station apparatus 200 as is, once a BSSID assigned to communication terminal 300 is determined, a data tunnel through which a data frame transmitted/received to/from the communication terminal passes is uniquely determined. In this embodiment, tunnel creation management section 104 transmits control data using the first one of the data tunnels and transmits data other than the transmission data using the second one of the data tunnels.

Furthermore, according to Embodiment 1, wireless LAN base station apparatus 200 is provided with tunnel creation management section 202 as the tunnel formation management section that forms a plurality of data tunnels and the control section that transmits data using different data tunnels according to the type of the transmission data.

By this means, for example, by using different data tunnels for control data and for data other than the control data, the reliability that the control data arrives at the destination increases and consequently the reliability of the control between AP control apparatus 100 and wireless LAN base station apparatus 200 increases. Therefore, it is possible to improve the stability and safety of communications.

In addition to the first one of the data tunnels defined by the base station MAC address of the own apparatus and the control station MAC address of AP control apparatus 100, tunnel creation management section 202 forms a second one of the data tunnels by the base station identification information of the own apparatus other than the base station MAC address and the control station MAC address. As this base station identification information, for example, a BSSID is used.

In this way, by using a BSSID assigned to the communication terminal which communicates with wireless LAN base station apparatus 200 as the base station identification information (for example, MAC address) on the AP control apparatus 100 side of wireless LAN base station apparatus 200 as is, once a BSSID assigned to communication terminal 300 is determined, a data tunnel through which a data frame transmitted/received to/from the communication terminal passes is uniquely determined. In this embodiment, tunnel creation management section 202 transmits control data using the first one of the data tunnels and transmits data other than the transmission data using the second one of the data tunnels.

In this way, according to Embodiment 1, it is possible to construct communication system 10 that increases the reliability of the control between AP control apparatus 100 and wireless LAN base station apparatus 200 and improve the stability and safety of communications.

Embodiment 2

Figure 16:
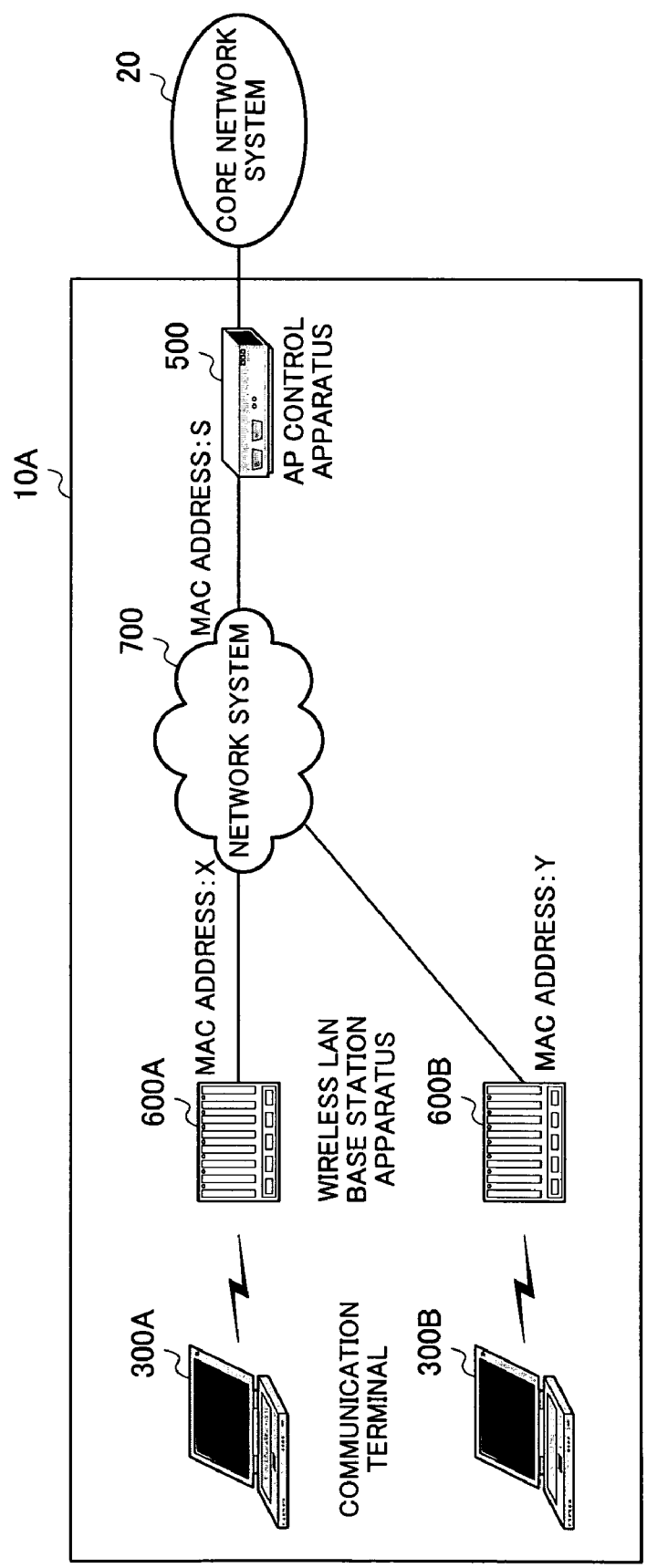
FIG. 16 is an overall configuration diagram of a communication system according to Embodiment 2.

As shown in FIG. 16, communication system 10A according to Embodiment 2 is provided with wireless LAN base station apparatus 600, AP control apparatus 500 that forms data tunnels determined or defined by a base station MAC address of wireless LAN base station apparatus 600 and the own control station MAC address and communicates using these data tunnels as a wireless LAN base station control apparatus, communication terminal 300 that accesses wireless LAN base station apparatus 600 to communicate therewith and network system 700. AP control apparatus 500 is connected to core network system 20.

Figure 17:
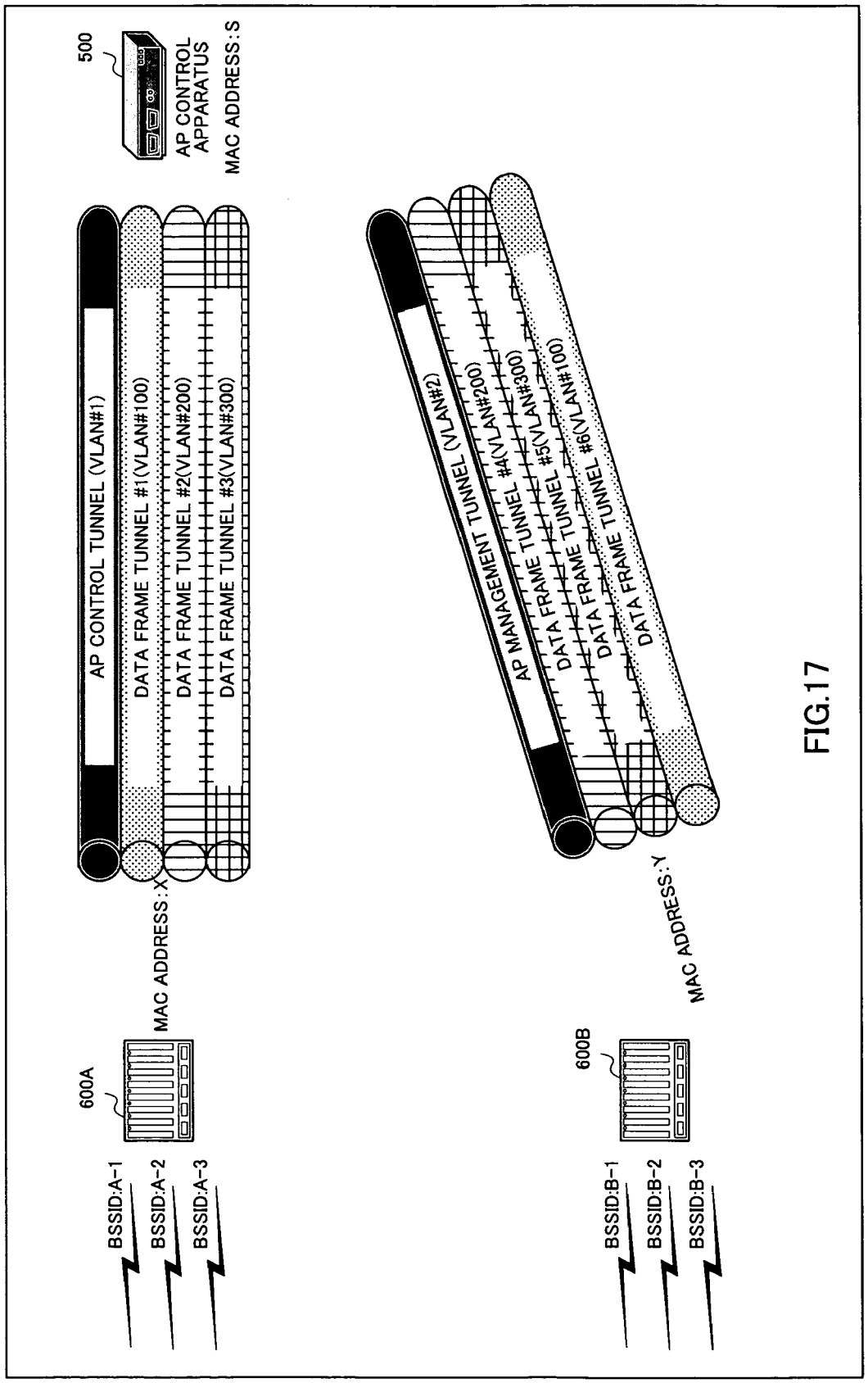
FIG. 17 illustrates data tunnels formed between an AP control apparatus and a wireless LAN base station apparatus in FIG. 16.

As shown in FIG. 17, in communication system 10A as in the case of AP control apparatus 100 and wireless LAN base station apparatus 200 in communication system 10 as described above, a data tunnel for passing a control frame and data tunnels for passing data frames other than the control frame are formed between AP control apparatus 500 and wireless LAN base station apparatus 600. Communication system 10A as in the case of communication system 10 can form a plurality of data tunnels between AP control apparatus 500 and wireless LAN base station apparatus 600 and use different data tunnels according to the type of the frame (control frame, data frames other than the control frame or the like).

By this means, as in the case of Embodiment 1, it is possible to eliminate the inconvenience that the AP control frame which is transmitted from AP control apparatus 500 to wireless LAN base station apparatus 600 does not arrive at wireless LAN base station apparatus 600 or that management of wireless LAN base station apparatus 600 by AP control apparatus 500 is not successfully performed, which may occur when traffic of data frames increases, that is, in the event of congestion. Furthermore, AP control frame and data frames are communicated through different data tunnels, and it is possibel to apply QoS and path selection or the like frame by frame.

However, when compared to communication system 10 according to Embodiment 1 in which data tunnels are formed by using a BSSID which is used for a communication between communication terminal 300 and wireless LAN base station apparatus 200 as the base station identification information (for example, MAC address) on the AP control apparatus 100 side of wireless LAN base station apparatus 200 as is, communication system 10A of Embodiment 2 is different in that it forms a plurality of data tunnels by newly introducing VLAN tag IDs and assigning different VLAN tag IDs to the data tunnels.

Figure 18:
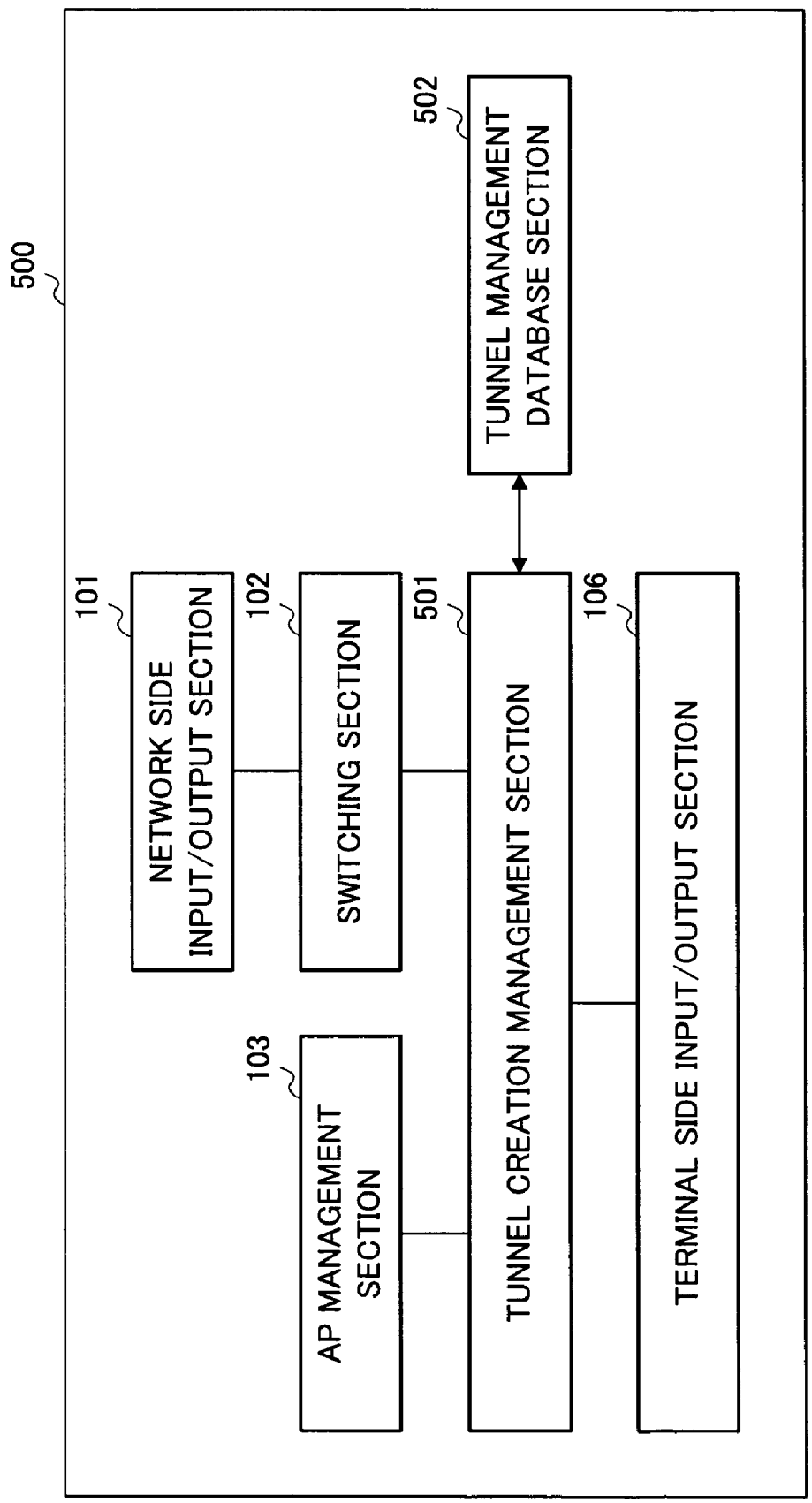
FIG. 18 is a block diagram showing the configuration of an AP control apparatus in FIG. 16.

As shown in FIG. 18, AP control apparatus 500 is provided with tunnel creation management section 501 and tunnel management database section 502.

Tunnel creation management section 501 creates data tunnels and manages tunnel management database section 502 or the like. Furthermore, tunnel creation management section 501 distributes frames input to different data tunnels.

As shown in FIG. 19, tunnel management database section 502 is provided with an AP control tunnel table, a data frame tunnel table and a data frame correspondence table.

As shown in of FIG. 19A, the AP control tunnel table includes entries of data tunnels to communicate control frames and each data tunnel is defined (specified) by a set of a destination MAC address, a sender MAC address and a VLAN tag ID. For example, tunnel ID 1 of the AP control tunnel table in FIG. 19A defines an AP control tunnel which is formed between AP control apparatus 500 and wireless LAN base station apparatus 600A shown in FIG. 17.

As shown in FIG. 19B, the data frame tunnel table includes entries of data tunnels to communicate data frames and each data tunnel is defined (specified) by a set of a destination MAC address, a sender MAC address and a VLAN tag ID. For example, tunnel ID 1 of the data frame tunnel table in FIG. 19B defines data frame tunnel #1 which is formed between AP control apparatus 500 and wireless LAN base station apparatus 600A shown in FIG. 17.

Moreover, the data frame tunnel table stores a tunnel identifier consisting of a set of a destination MAC address, a sender MAC address and a VLAN tag ID in correspondence with a BSSID. In this way, it is possible to specify to which data tunnel this data frame should be sent out by specifying a BSSID assigned to communication terminal 300 to which the data frame received by AP control apparatus 500 should be sent out. The same VLAN tag ID #100 is used for tunnel ID 1 and tunnel ID6 of the data frame tunnel table shown in 19B. However, these data tunnels are the data tunnels formed between two different wireless LAN base station apparatuses 600 and their destination MAC addresses are different, and therefore the data tunnels are uniquely determined by the tunnel identifiers.

As shown in FIG. 19C, the data frame correspondence table defines (specifies) which data tunnel should be used for each data frame. For example, if the terminal identifier of communication terminal 300A is assumed to be T1, when data frames are exchanged between communication terminal 300A and AP control apparatus 500, the table defines (specifies) that the data tunnel having tunnel ID 1 of the data frame tunnel table is used.

Figure 5:
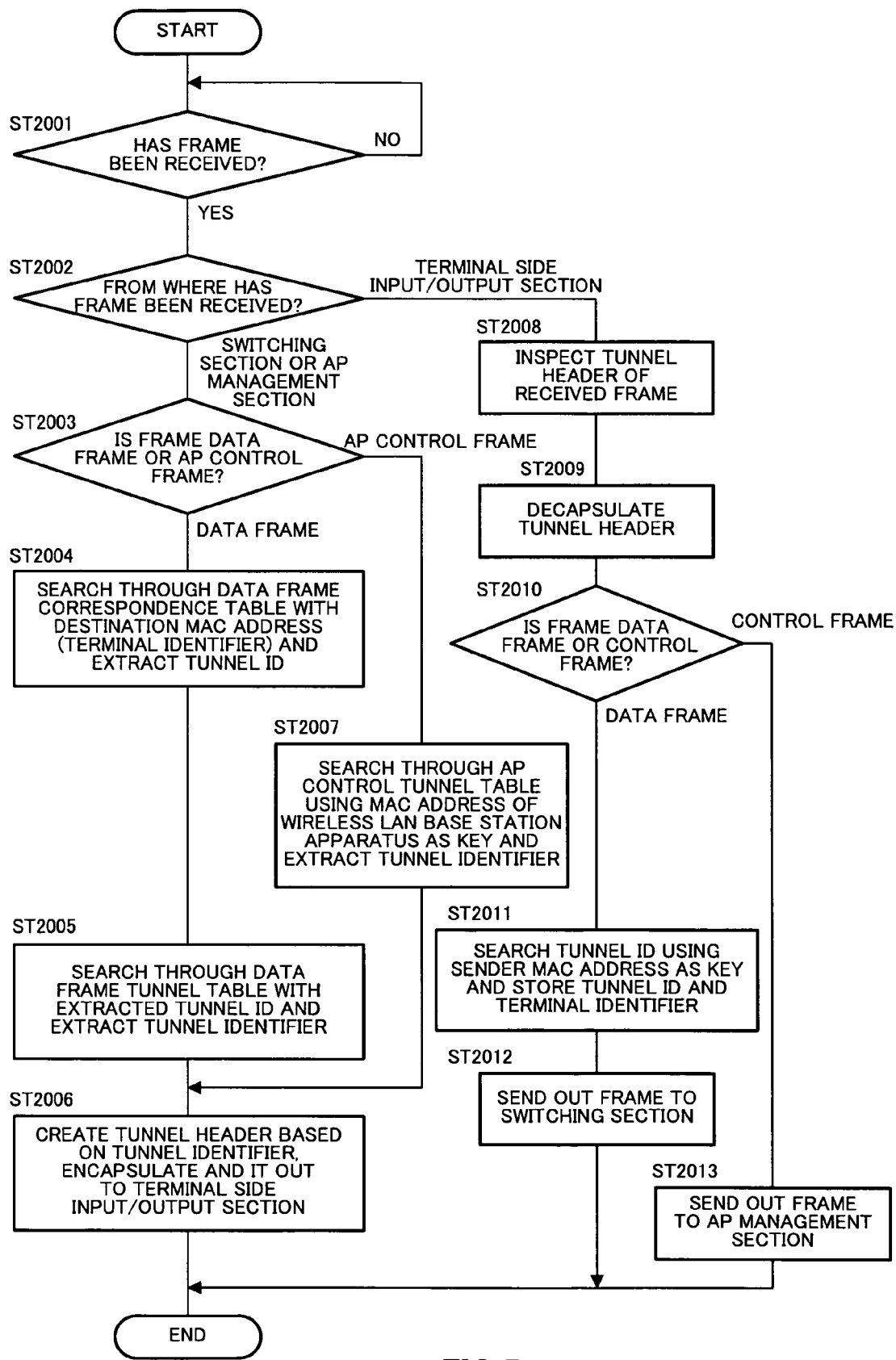
FIG. 5 is a flow chart illustrating the operation of a tunnel creation management section in FIG. 3.

The operation of tunnel creation management section 501 is basically identical to those of the tunnel creation management section 104 shown in FIG. 5, and descriptions thereof will be omitted. However, it is different in that the tunnel identifier handled by tunnel creation management section 501 is a set of a destination MAC address, a sender MAC address and further a VLAN tag ID. The configurations of an AP control frame for the control of wireless LAN base station apparatus 600 by AP control apparatus 500 and a data frame which is exchanged between AP control apparatus 500 and wireless LAN base station apparatus 600 are different from those in Embodiment 1 in that tunnel header 2501 of the data frame is newly provided with VLAN tag 2504 which is the area to include a VLAN tag ID and tunnel header 2521 of the AP control frame is also provided with VLAN tag 2524 (see FIG. 20A, FIG. 20B).

Figure 21:
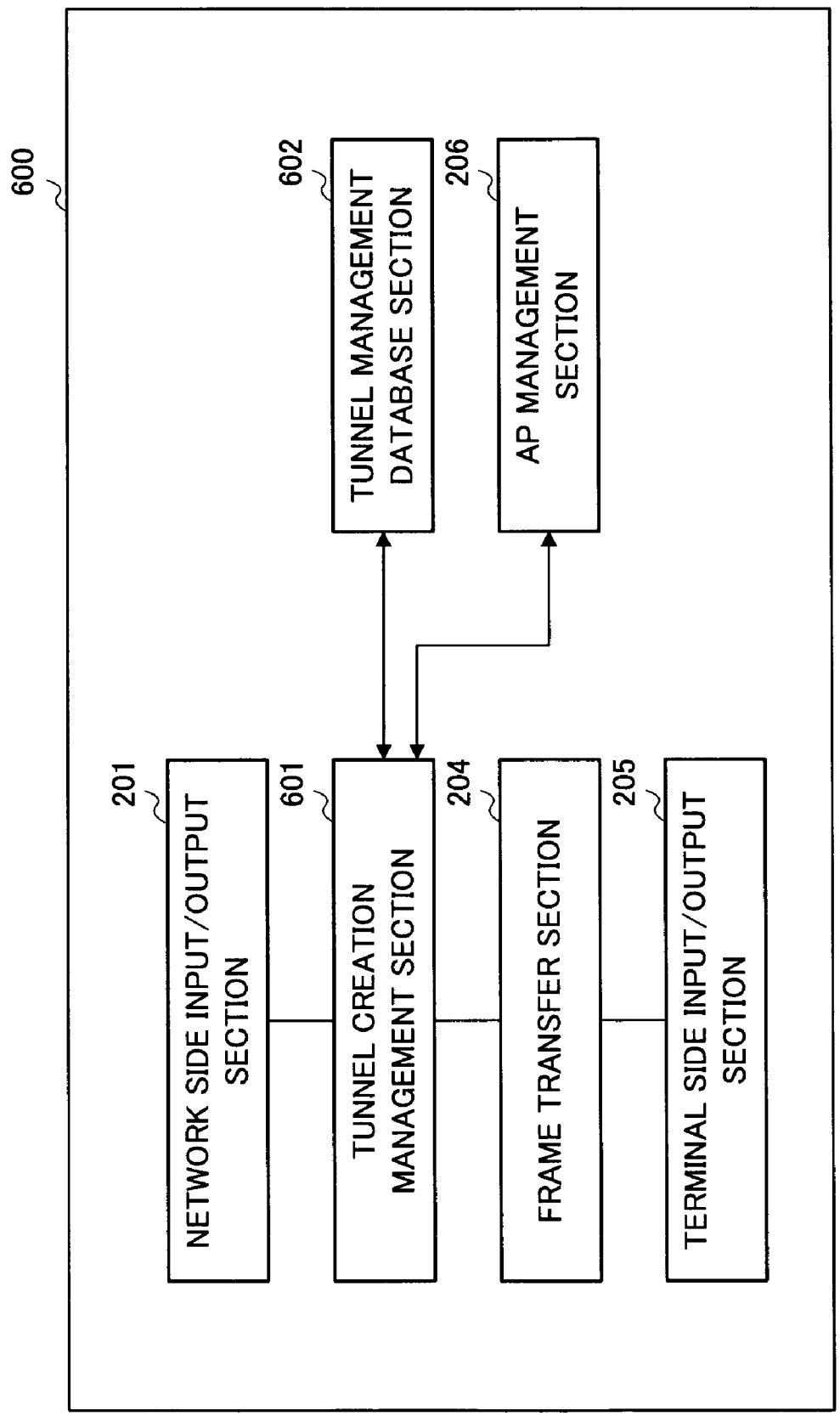
FIG. 21 is a block diagram showing the configuration of a wireless LAN base station apparatus in FIG. 16.

As shown in FIG. 21, wireless LAN base station apparatus 600 has tunnel creation management section 601 and tunnel management database section 602.

Tunnel creation management section 601 creates data tunnels and manages tunnel management database section 602 or the like. Furthermore, tunnel creation management section 601 distributes frames input to different data tunnels.

Tunnel management database section 602 is provided with an AP control tunnel table and a data frame tunnel table as shown in FIG. 22.

As shown in FIG. 22A, the AP control tunnel table includes entries of a data tunnel to communicate a control frame and the data tunnel is defined by a set of a destination MAC address and a sender MAC address, and further a VLAN tag ID.

As shown in FIG. 22B, the data frame tunnel table includes entries of data tunnels to communicate data frames and each data tunnel is defined by a tunnel identifier which is a set of a destination MAC address and a sender MAC address, and further a VLAN tag ID. For example, tunnel ID 1 of the data frame tunnel table in FIG. 22B defines data frame tunnel #1 which is formed between AP control apparatus 500 shown in FIG. 17 and wireless LAN base station apparatus 600A.

Moreover, the data frame tunnel table stores a tunnel identifier which consists of a set of a destination MAC address, a sender MAC address and a VLAN tag ID in correspondence with a BSSID. In this way, it is possible to specify to which data tunnel this data frame should be sent out by specifying a BSSID assigned to communication terminal 300 to which the data frame received by wireless LAN base station apparatus 600 should be sent out.

Figure 8:
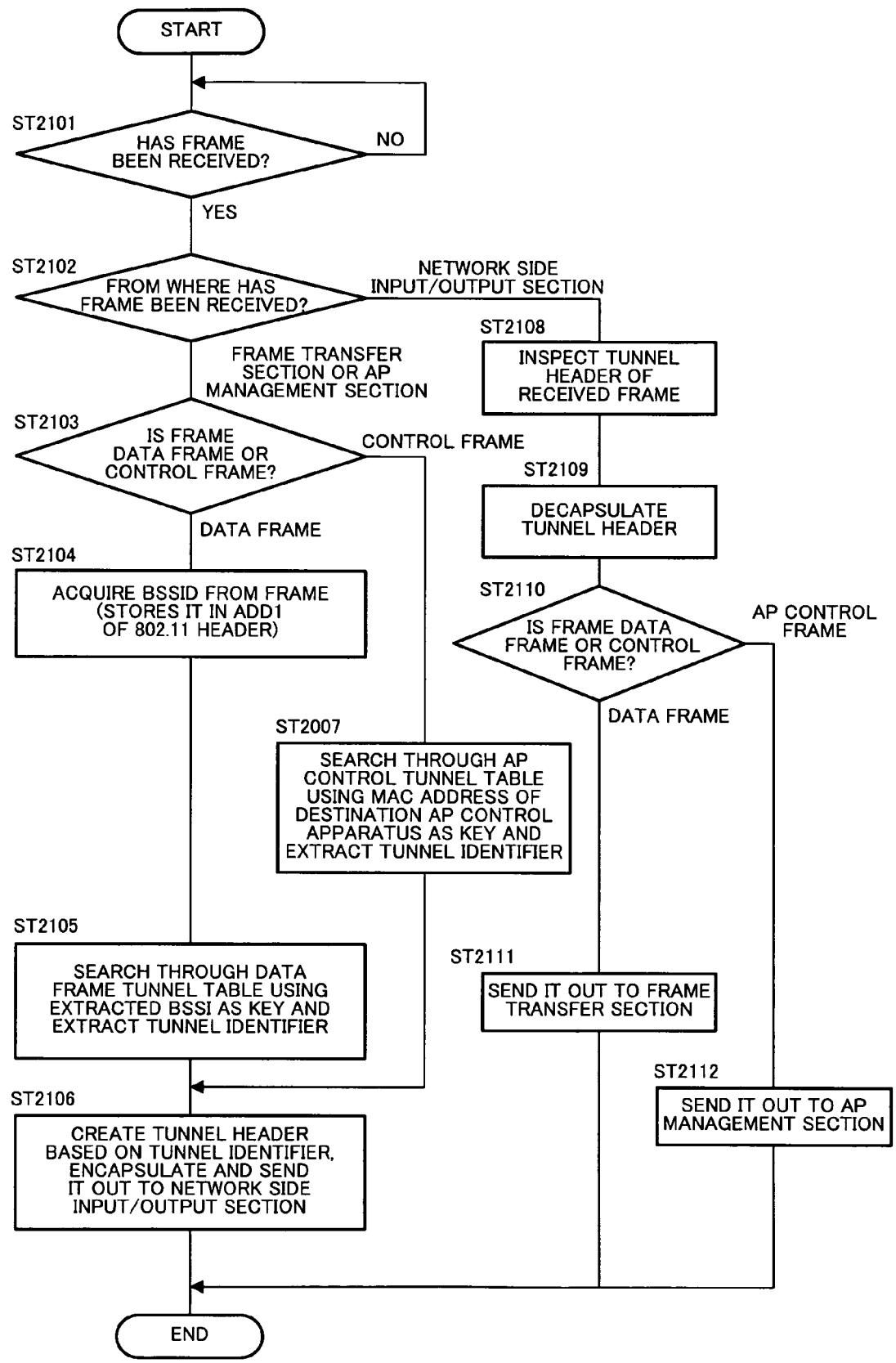
FIG. 8 is a flow chart illustrating the operation of a tunnel creation management section in FIG. 6.

The operation of tunnel creation management section 601 is basically the same as the operation of tunnel creation management section 202 shown in FIG. 8, and descriptions thereof will be omitted. However, it is different in that the tunnel identifier handled by tunnel creation management section 601 is a set of a destination MAC address, a sender MAC address and further a VLAN tag ID.

In this way, according to Embodiment 2, AP control apparatus 500 is provided with tunnel creation management section 501 as the tunnel formation management section that forms a plurality of data tunnels and as the control section that transmits data using different data tunnels according to the type of the transmission data. This tunnel creation management section 501 forms the plurality of data tunnels according to the data tunnel identification information (VLAN tag ID in this embodiment).

In this way, for example, by using different data tunnels for control data and for data other than the control data, the reliability that the control data arrives at the destination increases and consequently the reliability of the control between AP control apparatus 500 and wireless LAN base station apparatus 600 increases. Therefore, it is possible to improve the stability and safety of communications.

Furthermore, according to Embodiment 2, wireless LAN base station apparatus 600 is provided with tunnel creation management section 601 as the tunnel formation management section that forms a plurality of data tunnels and as the control section that transmits data using different data tunnels according to the type of the transmission data.

In this way, for example, by using different data tunnels for control data and for data other than the control data, the reliability that the control data arrives at the destination increases and consequently the reliability of the control between AP control apparatus 500 and wireless LAN base station apparatus 600 increases. Therefore, it is possible to improve the stability and safety of communications.

In this way, according to Embodiment 2, it is possible to increases the reliability of the control between AP control apparatus 500 and wireless LAN base station apparatus 600 and construct communication system 10A capable of improving the stability and safety of communications.

Embodiment 3

Figure 23:
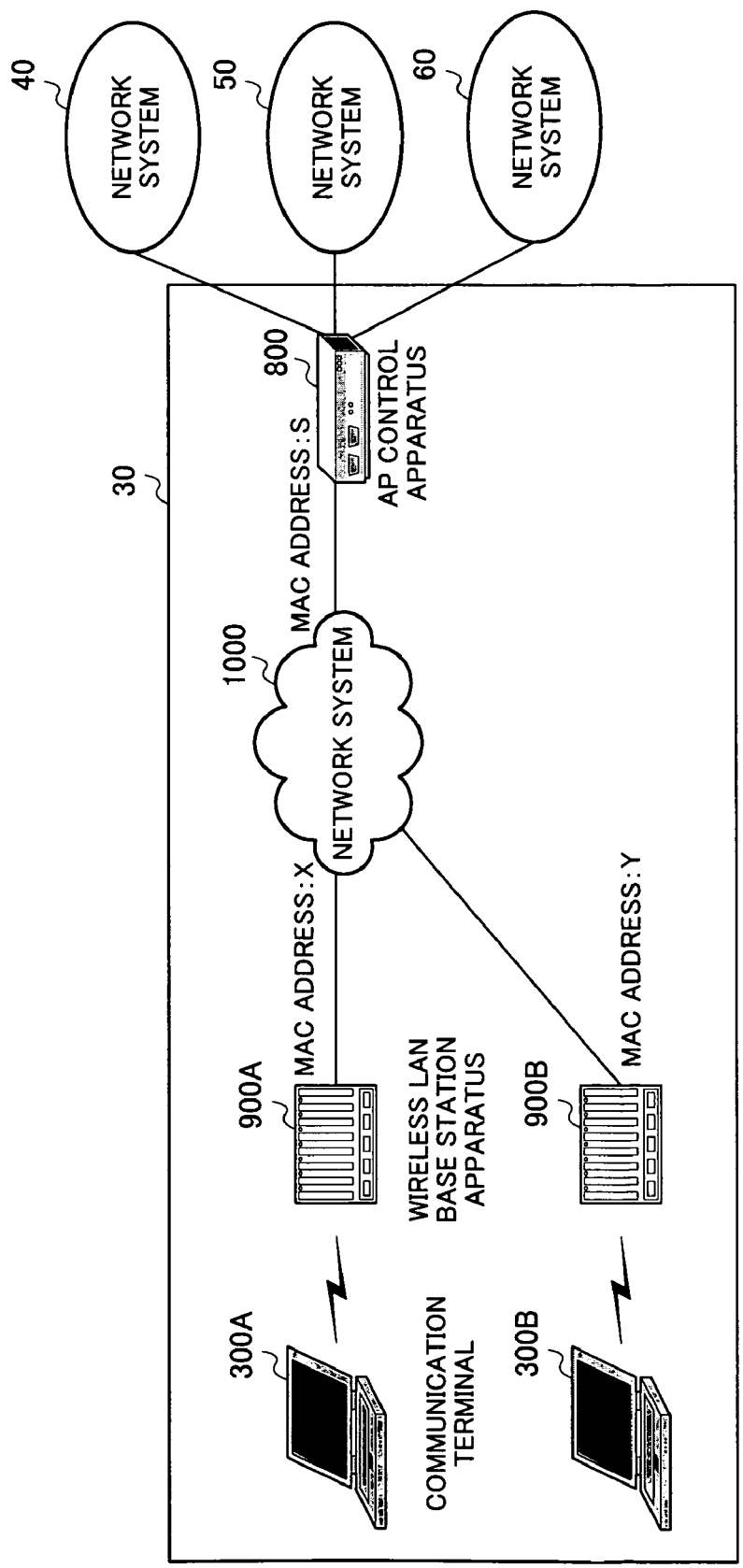
FIG. 23 is an overall configuration diagram of a communication system according to Embodiment 3.

As shown in the FIG. 23, communication system 30 according to Embodiment 3 is provided with wireless LAN base station apparatus 900, AP control apparatus 800 as a wireless LAN base station control apparatus that forms data tunnels determined or defined by a base station MAC address of wireless LAN base station apparatus 900 and the own control station MAC address and communicates using these data tunnels, communication terminal 300 that accesses wireless LAN base station apparatus 900 to communicate therewith and network system 1000. AP control apparatus 800 is connected to a plurality of network systems (network systems 40 to 60 here) located outside when viewed from communication system 30.

Figure 24:
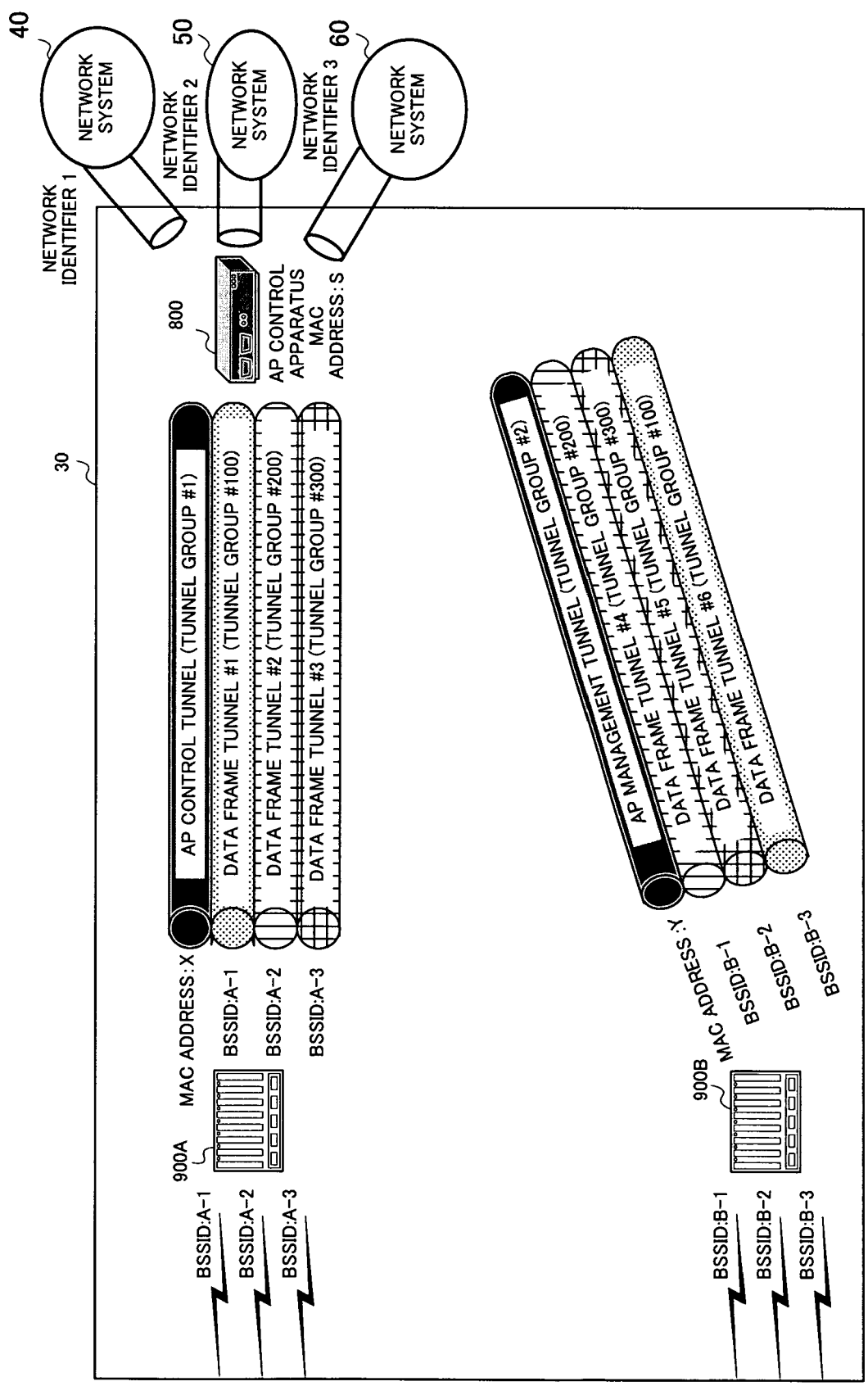
FIG. 24 illustrates data tunnels formed between an AP control apparatus and a wireless LAN base station apparatus in FIG. 23.

As shown in FIG. 24, in communication system 30 as in the case of AP control apparatus 100 and wireless LAN base station apparatus 200 in communication system 10 as described above, a data tunnel for passing a control frame and data tunnels for passing data frames other than the control frame are formed between AP control apparatus 800 and wireless LAN base station apparatus 900. Communication system 30 as in the case of communication system 10 can form a plurality of data tunnels between AP control apparatus 800 and wireless LAN base station apparatus 900 and use different data tunnels according to the type of the frame (control frame, data frames other than the control frame or the like).

However, communication system 30 further groups formed data tunnels and forms a virtual LAN using the grouped data tunnels. More specifically, for example, data frame tunnel #1 and data frame tunnel #6 are assigned identical tunnel group identifier #100 and these data tunnels construct a virtual LAN. In this way, when broadcast frames are transmitted over a downlink, AP control apparatus 800 needs not create any unicast frame to each destination data tunnel, and can transmit the broadcast frames in tunnel group units, and can thereby reduce the amount of processing at AP control apparatus 800.

Furthermore, by associating identifiers of network systems outside AP control apparatus 800 with tunnel group identifiers, AP control apparatus 800 can determine to which virtual LAN data should be transmitted according to the network system from which a broadcast frame is transmitted and thereby reduce the amount of processing. It is also possible to determine priority in tunnel group units using, for example, a priority bit of a VLAN tag.

Figure 25:
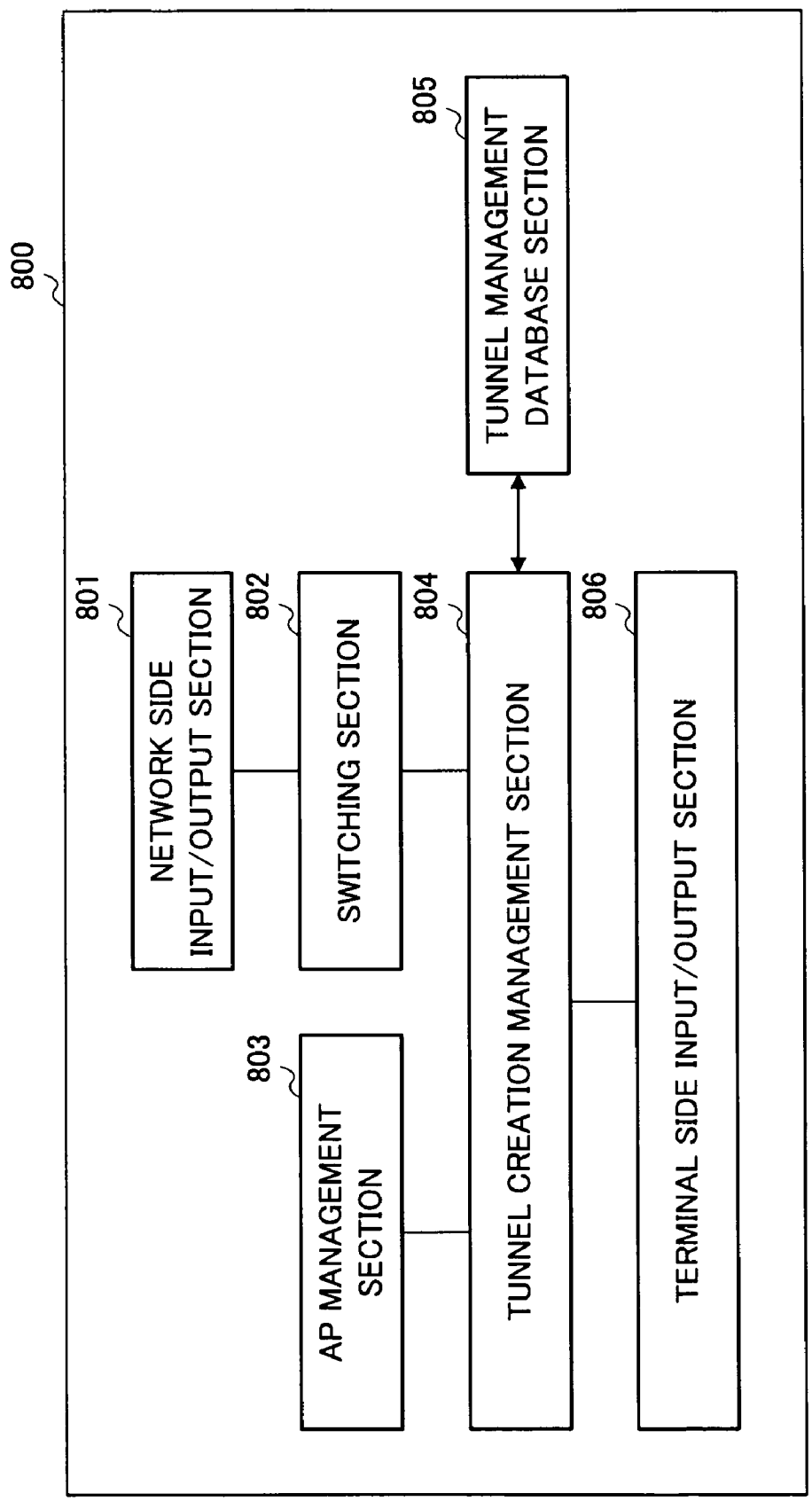
FIG. 25 is a block diagram showing the configuration of an AP control apparatus in FIG. 23.

As shown in FIG. 25, AP control apparatus 800 is provided with network side input/output section 801, switching section 802, AP management section 803, tunnel creation management section 804, tunnel management database section 805 and terminal side input/output section 806.

Network side input/output section 801 inputs/outputs frames to/from the network side, that is, network systems 40 to 60. More specifically, it sends out frames input from network systems 40 to 60 to switching section 802 and sends out frames input from switching section 802 to network systems 40 to 60 to which frames should be sent out.

Switching section 802 switches frames input to any one of the network side and the terminal side. More specifically, switching section 802 sends out frames input to network side input/output section 801 or tunnel creation management section 804. Furthermore, switching section 802 creates the header of a 802.11 frame using a Ether header of the received frame or the like and performs preparation processing for the tunnel header creation processing at tunnel creation management section 804.

AP management section 803 performs processing for managing wireless LAN base station apparatus 800. More specifically, AP management section 803 generates an AP control frame to control wireless LAN base station apparatus 800 and sends it out to tunnel creation management section 804.

Tunnel creation management section 804 creates data tunnels and manages tunnel management database section 805 or the like. Furthermore, tunnel creation management section 804 distributes frames input to different data tunnels. Furthermore, when a frame input is a broadcast frame, it sends out the frame to a virtual LAN to which the frame should be sent. Furthermore, tunnel creation management section 804 performs tunnel header creation processing. The details of the operation of this tunnel creation management section 804 will be described later.

As shown in FIG. 26, tunnel management database section 805 is provided with an AP control tunnel table, a data frame tunnel table, a data frame correspondence table and a group correspondence table.

As shown in FIG. 26A, the AP control tunnel table includes entries of data tunnels to communicate control frames and each data tunnel is defined (specified) by a set of an address MAC address and a sender MAC address. Furthermore, each data tunnel is associated with a tunnel group identifier.

As shown in FIG. 26B, the data frame tunnel table includes entries of data tunnels to communicate data frames and each data tunnel is defined (specified) by a set of a destination MAC address and a sender MAC address. Here, a BSSID is used as the MAC address of wireless LAN base station apparatus 900. Furthermore, each data tunnel is associated with a tunnel group identifier. Tunnel ID 1 and tunnel ID 6 of the data frame tunnel table in FIG. 26B have the same tunnel group identifier #100 and the data tunnels specified by tunnel ID 1 and tunnel ID 6 form an identical virtual LAN.

As shown in FIG. 29C, the data frame correspondence table defines (specifies) which data tunnel should be used for each data frame. When, for example, the terminal identifier of communication terminal 300A is assumed to be T1, the table defines (specifies) that the data tunnel with tunnel ID 1 of the data frame tunnel table is used when data frames are exchanged between communication terminal 300A and AP control apparatus 800.

As shown in FIG. 26D, the group correspondence table stores network identifiers in correspondence with tunnel group identifiers. The group correspondence table is used especially when a broadcast frame is transmitted over a downlink and stores the network identifier of the network system from which a broadcast frame has been transmitted in correspondence with the tunnel group identifier which specifies a virtual LAN which should send out the broadcast frame.

More specifically, index 1 of the group correspondence table shown in FIG. 26D shows network identifier 1 in correspondence with tunnel group identifier #100 and this assumes that the broadcast frame transmitted from network system 40 shown in FIG. 24 is sent out to a virtual LAN specified by tunnel group identifier #100.

Figure 27:
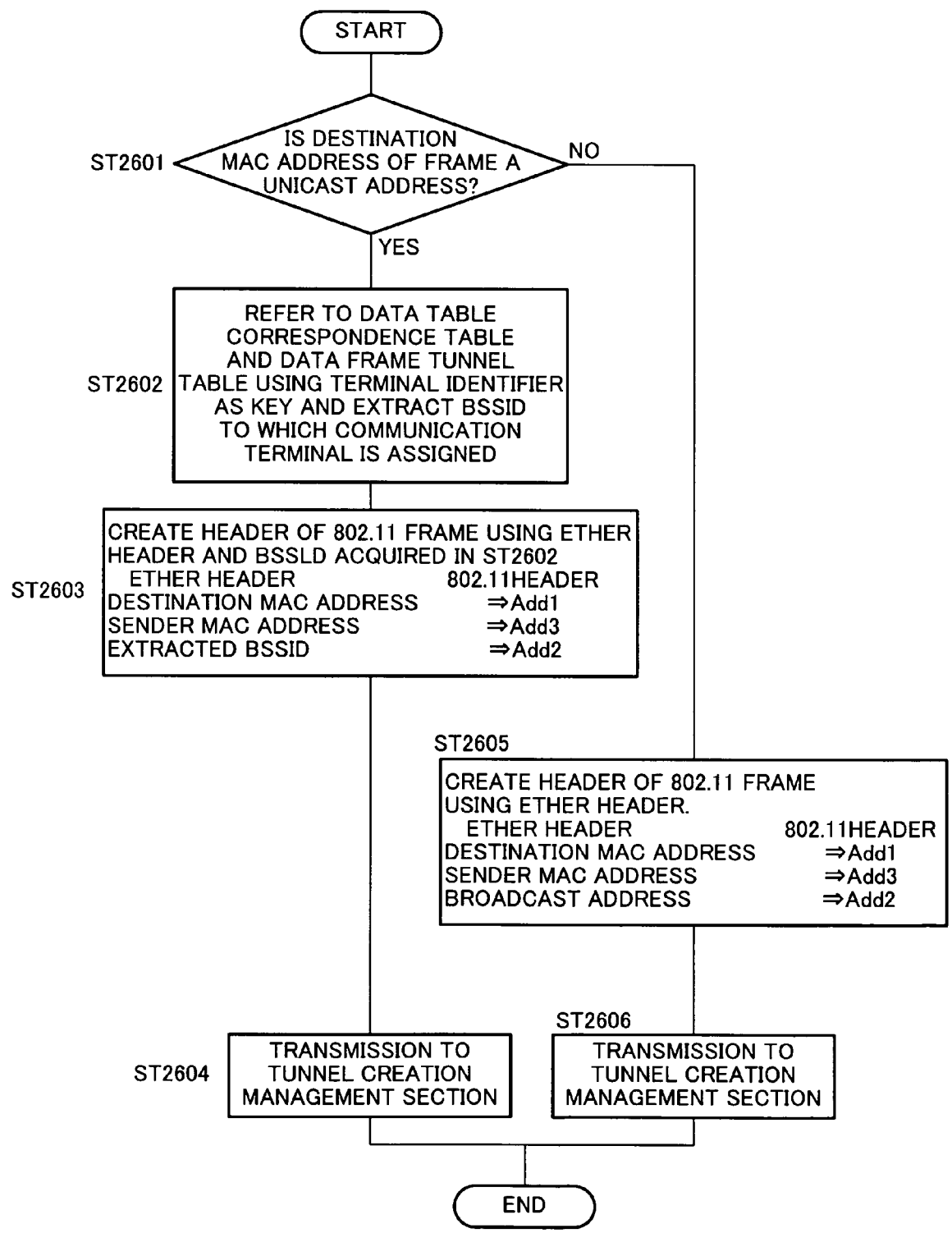
FIG. 27 is a flow chart illustrating the operation of a switching section in FIG. 25.

Next, the operation of switching section 802 will be described with reference to FIG. 27. FIG. 27 shows especially only the flow of a downlink frame, that is, a case where switching section 802 inputs a frame from network side input/output section 801.

Upon receiving a frame from network side input/output section 801, switching section 802 first judges whether or not the destination MAC address of the frame is a unicast address (step ST2601).

When the decision result shows that the destination MAC address is a unicast address (step ST2601: YES), this unicast address is the terminal identifier of communication terminal 300 which is the destination of the frame, and switching section 802 refers to the data frame correspondence table and the data frame tunnel table of tunnel management database section 805 through the tunnel creation management section 804 using this terminal identifier as a key and extracts a BSSID to which communication terminal 300 specified from the terminal identifier is assigned (step ST2602). More specifically, switching section 802 refers to the data frame correspondence table, uses a terminal identifier as a key and specifies the tunnel ID which corresponds to this. Switching section 802 then refers to the data frame tunnel table, and extracts the destination MAC address of the tunnel identifier using the specified tunnel ID as a key. This embodiment uses a BSSID as the destination MAC address of this tunnel identifier, and can thereby acquire the BSSID by extracting the destination MAC address of the tunnel identifier.

In step ST2603, switching section 802 creates the header of the 802.11 frame using the Ether header added to the frame sent from the network side and the BSSID acquired in step ST2602. More specifically, the destination MAC address of the Ether header is input to Add1 of the 802.11 frame, the sender MAC address of the Ether header is input to Add3 of the 802.11 frame and the BSSID acquired in step ST2602 is input to Add2.

In step ST2604, switching section 802 sends out the 802.11 frame to which the header created in step ST2603 is added to tunnel creation management section 804.

Furthermore, the decision result in step ST2601 shows that the destination MAC address of the frame is not a unicast address (step ST2601: NO), switching section 802 creates the header of the 802.11 frame using the Ether header added to the frame which is sent from the side of the network side (step ST2605). More specifically, the destination MAC address of the Ether header is input to Add1 of the 802.11 frame, the sender MAC address of the Ether header is input to Add3 of the 802.11 frame and a broadcast address is input to Add2.

In step ST2606, switching section 802 sends out the 802.11 frame to which the header created in step ST2605 is added to tunnel creation management section 804.

Figure 28:
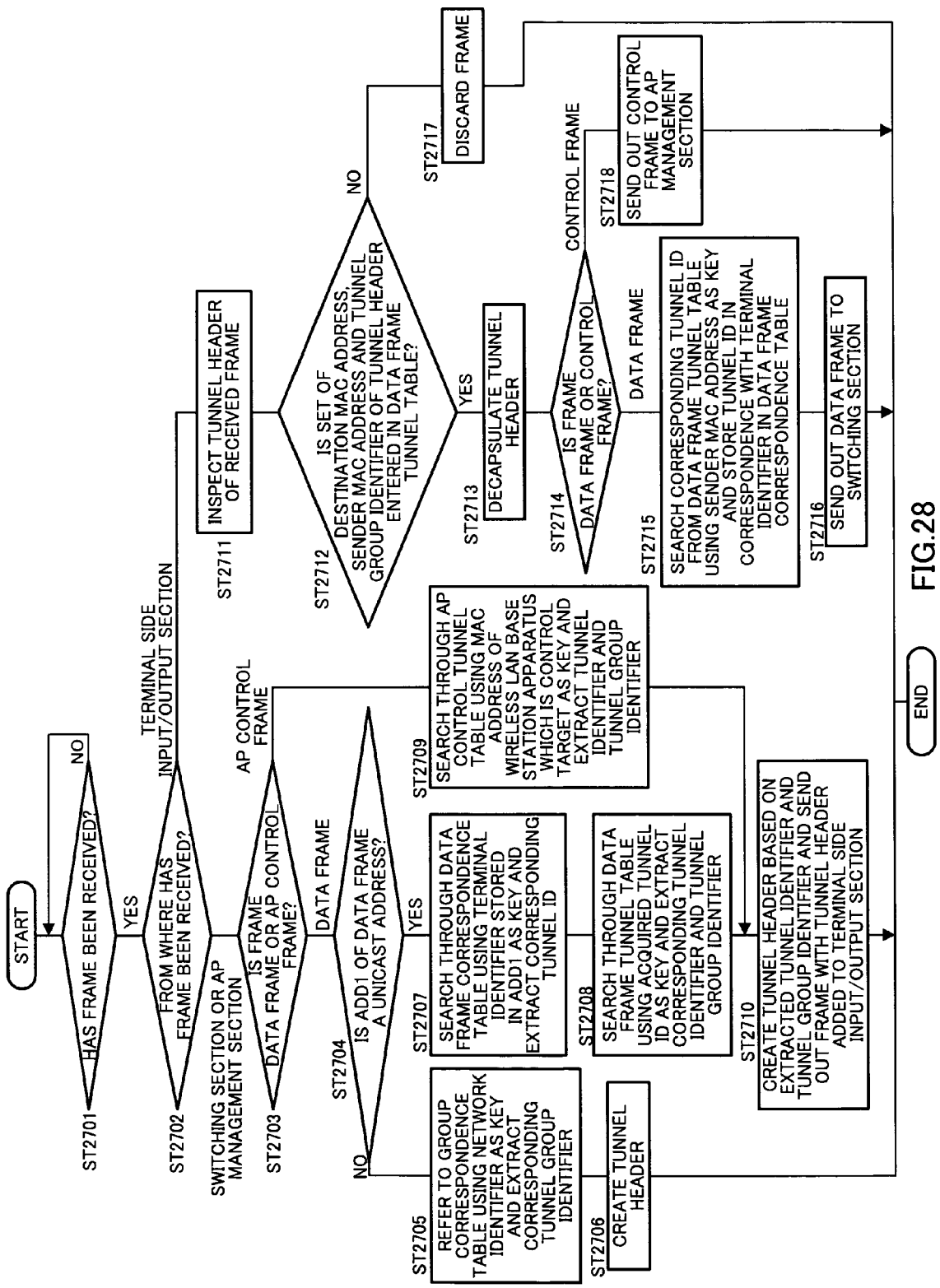
FIG. 28 is a flow chart illustrating the operation of a tunnel creation management section in FIG. 25.

Next, the operation of tunnel creation management section 804 will be described with reference to FIG. 28.

First, upon receiving a frame in step ST2701, tunnel creation management section 804 judges from where the frame has been received (step ST2702).

When judging in step ST2702 that the frame has been received from switching section 802 or AP management section 803, tunnel creation management section 804 judges whether the frame is a data frame or an AP control frame (step ST2703).

When judging in step ST2703 that the frame is a data frame, tunnel creation management section 804 judges whether or not Add1 of the data frame is a unicast address (step ST2704).

When the decision result shows that Add1 is not a unicast address (step ST2704: NO), tunnel creation management section 804 refers to the group correspondence table and extracts a corresponding tunnel group identifier using the network identifier added to the data frame which indicates from which network system the data frame is transmitted as a key (step ST2705).

In step ST2706, tunnel creation management section 804 creates a tunnel header. More specifically, it inputs a broadcast address as the destination MAC address of the tunnel header, inputs the MAC address of the own port as the sender MAC address and inputs the tunnel group identifier extracted in step ST2705 to the VLAN tag area and a tunnel header is created in this way. Then, it adds a tunnel header created to the 802.11 frame, that is, it encapsulates the 802.11 frame with the tunnel header created and sends it out to terminal side input/output section 806.

When the decision result in step ST2704 shows that Add1 is a unicast address (step ST2704: YES), tunnel creation management section 804 searches through the data frame correspondence table using the terminal identifier which is stored as the destination MAC address of Add1 as a key and extracts the corresponding tunnel ID (step ST2707).

In step ST2708, tunnel creation management section 804 searches through the data frame tunnel table using the tunnel ID acquired in step ST2707 as a key and extracts the corresponding tunnel identifier and tunnel group identifier.

When judging in step ST2703 that the frame is an AP control frame, tunnel creation management section 804 searches through the AP control tunnel table using the MAC address of wireless LAN base station apparatus 900 which is included in the AP control frame and is a control target as a key and extracts a tunnel identifier and a tunnel group identifier (step ST2709).

In step ST2710, tunnel creation management section 804 creates a tunnel header based on the tunnel identifier and the tunnel group identifier extracted in step ST2708 or step ST2709 and sends out the frame to which this tunnel header has been added to terminal side input/output section 806.

When judging in step ST2702 that the frame has been received from terminal side input/output section 806, tunnel creation management section 804 inspects the tunnel header of the received frame (step ST2711).

In step ST2712, tunnel creation management section 804 then judges whether the set of the destination MAC address, the sender MAC address and the tunnel group identifier of the tunnel header of the received frame has been entered in the data frame tunnel table.

When the decision result shows that the set has been entered (step ST2712: YES), tunnel creation management section 804 removes the tunnel header, that is, decapsulates it (step ST2713).

In step ST2714, tunnel creation management section 804 judges whether or not the decapsulated frame is a data frame or a control frame.

When the decision result in step ST2714 shows that the frame is a data frame, tunnel creation management section 804 searches the corresponding tunnel ID from the data frame tunnel table using the sender MAC address (the MAC address of communication terminal 900 here) included in the data frame as a key and stores the tunnel ID in correspondence with the terminal identifier (the MAC address of communication terminal 900) in the data frame correspondence table (step ST2715).

Tunnel creation management section 804 sends out the data frame to switching section 802 (step ST2716).

When the decision result in step ST2712 shows that the set has not been entered (step ST2712: NO), the frame is discarded (step ST2717).

When the decision result in step ST2714 shows that the frame is a control frame, the control frame is sent out to AP management section 803 (step ST2718).

Figure 29:
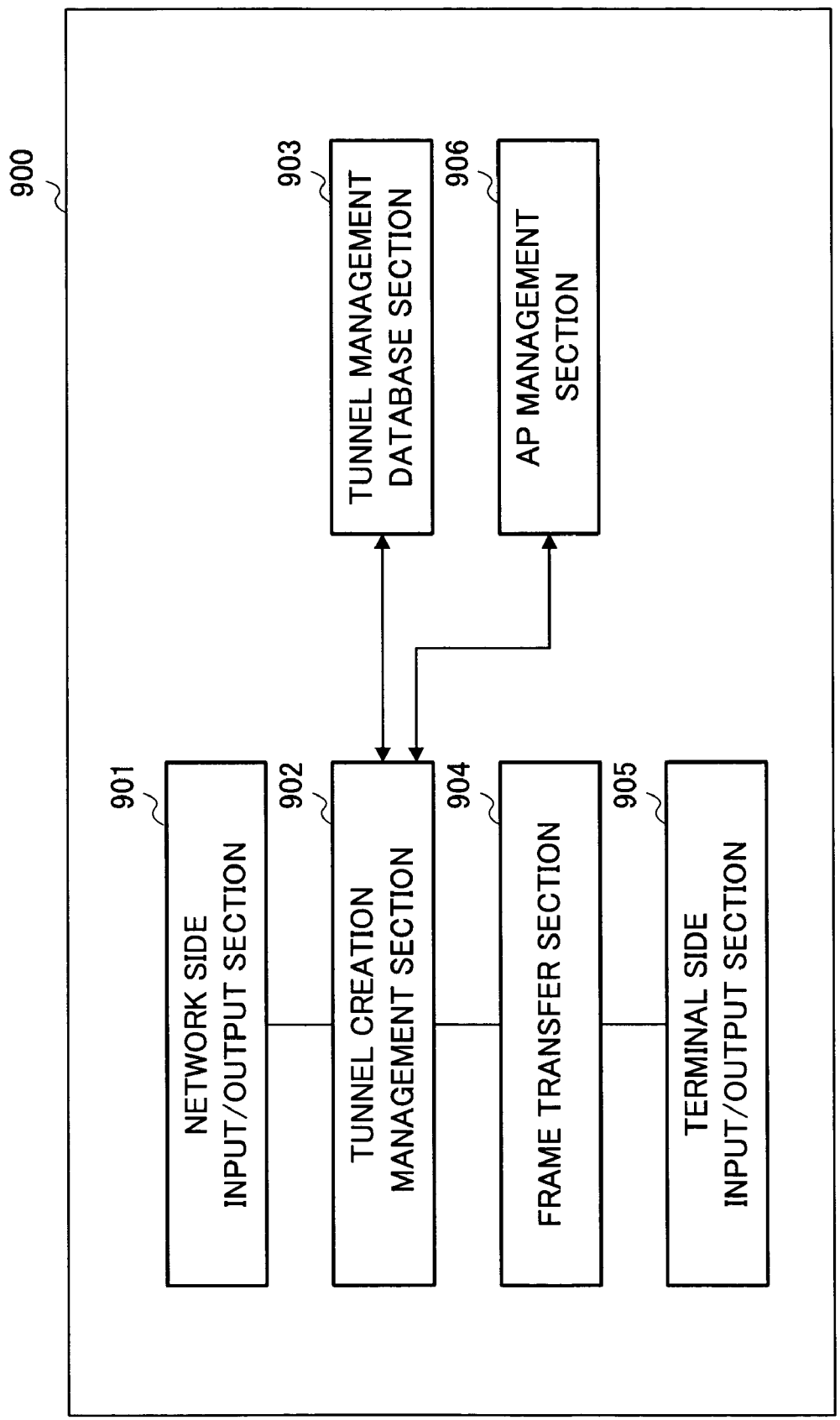
FIG. 29 is a block diagram showing the configuration of a wireless LAN base station apparatus in FIG. 23.

As shown in FIG. 29, wireless LAN base station apparatus 900 is provided with network side input/output section 901, tunnel creation management section 902, tunnel management database section 903, frame transfer section 904 and terminal side input/output section 905 and AP management section 906.

Network side input/output section 901 inputs/outputs frames to/from the network side, that is, the AP control apparatus 800 side. More specifically, network side input/output section 901 sends out a frame which is input from the AP control apparatus 800 side to tunnel creation management section 902 and also sends out a frame which is input from tunnel creation management section 902 to AP control apparatus 800.

Tunnel creation management section 902 creates data tunnels and manages tunnel management database section 903 or the like. Furthermore, tunnel creation management section 902 distributes frames input to different data tunnels. The details of the operation of this tunnel creation management section 902 will be described later.

As shown in FIG. 30, tunnel management database section 903 is provided with an AP control tunnel table and a data frame tunnel table.

The AP control tunnel table includes entries of data tunnels to communicate a control frame as shown in FIG. 30A and a data tunnel is defined by a set of a destination MAC address and a sender MAC address. Furthermore, the data tunnel is associated with a tunnel group identifier.

As shown in FIG. 30B, the data frame tunnel table includes entries of data tunnels to communicate data frames and each data tunnel is defined (specified) by a set of a destination MAC address and a sender MAC address. Here, a BSSID is used as the MAC address of wireless LAN base station apparatus 900. Furthermore, each data tunnel is associated with a tunnel group identifier.

Frame transfer section 904 performs appropriate protocol processing on a frame received from tunnel creation management section 902 and sends out the frame after the protocol processing to terminal side input/output section 905. Furthermore, frame transfer section 904 performs appropriate protocol processing to a frame received from terminal side input/output section 905 and sends out the frame after the protocol processing to tunnel creation management section 902.

Terminal side input/output section 905 sends out a frame from communication terminal 300 to frame transfer section 904 and also sends out a frame from frame transfer section 904 to communication terminal 300.

AP management section 906 performs processing for managing the own apparatus, that is, wireless LAN base station apparatus 900. More specifically, it receives a control frame for control of wireless LAN base station apparatus 900 (hereinafter, referred to as an "AP control frame") from AP control apparatus 800 and manages the own apparatus, generates a control frame to be sent out to AP control apparatus 800 in response to the AP control frame and sends it out to tunnel creation management section 902.

Figure 31:
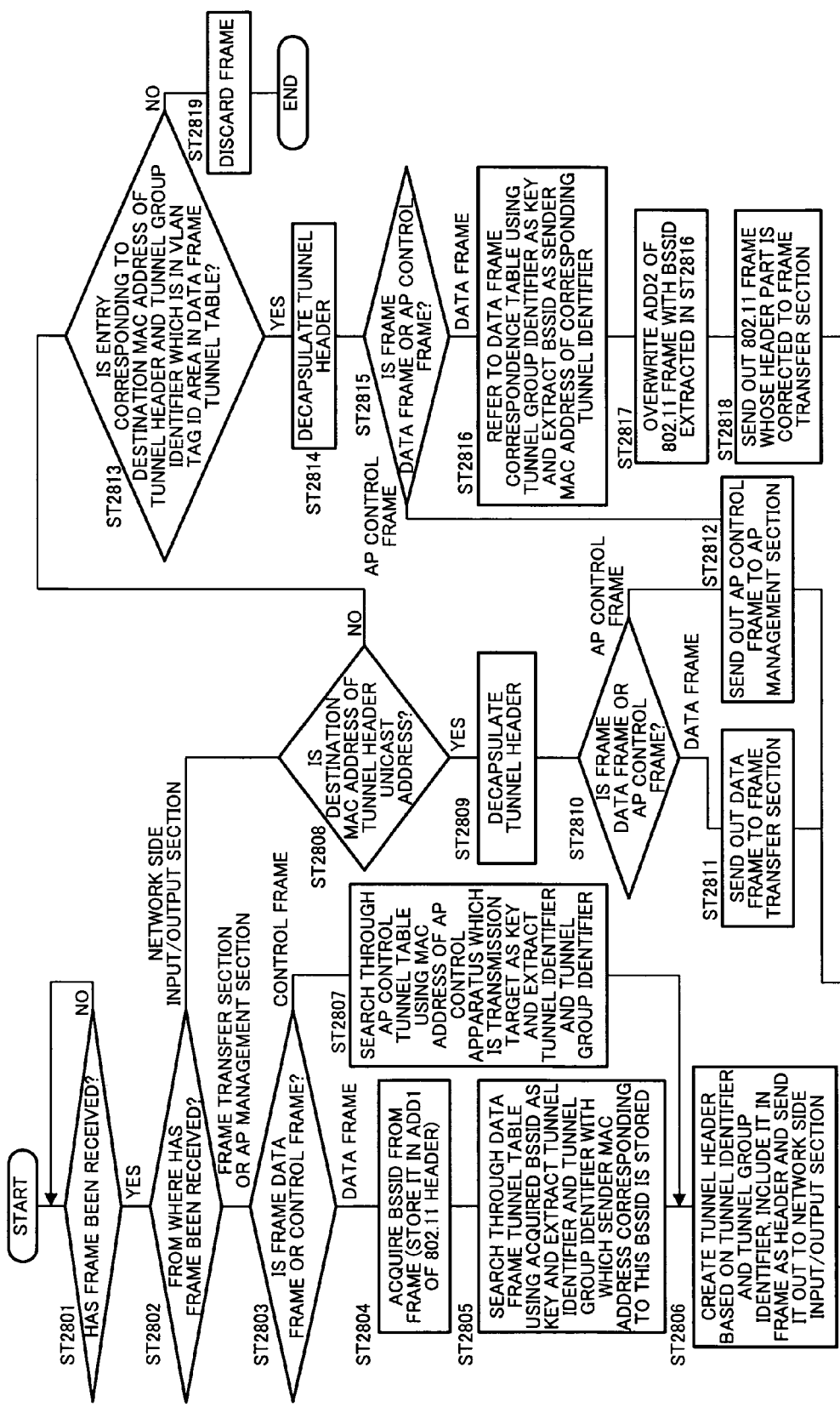
FIG. 31 is a flow chart illustrating the operation of a tunnel creation management section in FIG. 29.

Next, the operation at tunnel creation management section 902 will be described with reference to FIG. 31. First, upon receiving a frame in step ST2801, tunnel creation management section 902 judges from where the frame has been received (step ST2802).

When judging in step ST2802 that the frame has been received from frame transfer section 904 or AP management section 906, tunnel creation management section 902 judges whether the frame is a data frame or a control frame (step ST2803).

When judging in step ST2803 that the frame is a data frame, tunnel creation management section 902 acquires a BSSID included in the frame (step ST2804). The BSSID is stored in Add1 of the 802.11 header.

In step ST2805, tunnel creation management section 902 searches through the data frame tunnel table using the BSSID extracted in step ST2804 as a key and extracts the tunnel identifier in which the sender MAC address which corresponds to this BSSID is stored, that is, the destination MAC address, sender MAC address and tunnel group identifier.

In step ST2806, tunnel creation management section 902 creates a tunnel header based on the tunnel identifier and the tunnel group identifier extracted in step ST2805 or step ST2807 which will be described later, includes it in the frame as the header, that is, encapsulates it and sends it out to network side input/output section 901.

When judging in step ST2803 that the frame is a control frame, tunnel creation management section 902 searches through the AP control tunnel table using the MAC address of the AP control apparatus 800 which is included in the control frame and is the transmission target as a key and extracts a tunnel identifier and a tunnel group identifier (step ST2807).

When judging in step ST2802 that the frame has been received from network side input/output section 901, tunnel creation management section 902 judges whether or not the destination MAC address of the tunnel header in the received frame is a unicast address (step ST2808).

When the decision result shows that the destination MAC address is a unicast address (step ST2808: YES), the tunnel header is removed, that is, decapsulated (step ST2809).

In step ST2810, tunnel creation management section 902 then judges whether the decapsulated frame is a data frame or an AP control frame.

When the decision result in step ST2810 shows that the decapsulated frame is a data frame, tunnel creation management section 902 sends out the data frame to frame transfer section 904 (step ST2811).

When the decision result in step ST2810 shows that the frame is an AP control frame from AP control apparatus 800, tunnel creation management section 902 sends out the AP control frame to AP management section 906 (step ST2812).

When the decision result in step ST2808 shows that the destination MAC address is not a unicast address (step ST2808: NO), tunnel creation management section 902 judges whether the entries corresponding to the destination MAC address of the tunnel header of the received frame and the tunnel group identifier in the VLAN tag ID area are included in the data frame tunnel table (step ST2813).

When the decision result shows that the entries are included (step ST2813: YES), tunnel creation management section 902 removes, that is, decapsulates the tunnel header (step ST2814).

In step ST2815, tunnel creation management section 902 judges whether the decapsulated frame is a data frame or an AP control frame.

When the decision result in step ST2815 shows that the decapsulated frame is an AP control frame from AP control apparatus 800, tunnel creation management section 902 sends out the AP control frame to AP management section 906 (step ST2812).

When the decision result in step ST2815 shows that the decapsulated frame is a data frame, tunnel creation management section 902 refers to the data frame correspondence table using the tunnel group identifier included in the VLAN tag ID area of the tunnel header removed in step ST2814 as a key and extracts the BSSID as the sender MAC address of the corresponding tunnel identifier (step ST2816).

In step ST2817, tunnel creation management section 902 overwrites Add2 (a broadcast address is stored here) of the 802.11 frame with the BSSID extracted in step ST2816.

In step ST2818, tunnel creation management section 902 sends out the 802.11 frame whose header part has been corrected in step ST2817 to frame transfer section 904.

When the decision result in step ST2813 shows that the entries are not included (step ST2813: NO), tunnel creation management section 902 discards the received frame (step ST2819).

Thus, according to Embodiment 3, AP control apparatus 800 is provided with tunnel creation management section 804 as the tunnel formation management section that forms a plurality of data tunnels and as the control section that transmits data using different data tunnels according to the type of the transmission data. This tunnel creation management section 804 adds tunnel group identification information to the data tunnels formed therefrom to different wireless LAN base station apparatuses 900 to form a virtual LAN according to the tunnel group identification information.

By this means, it is possible to group a plurality of data tunnels and thereby easily perform control in a unit (virtual LAN) greater than a data tunnel.

Embodiment 4

Figure 32:
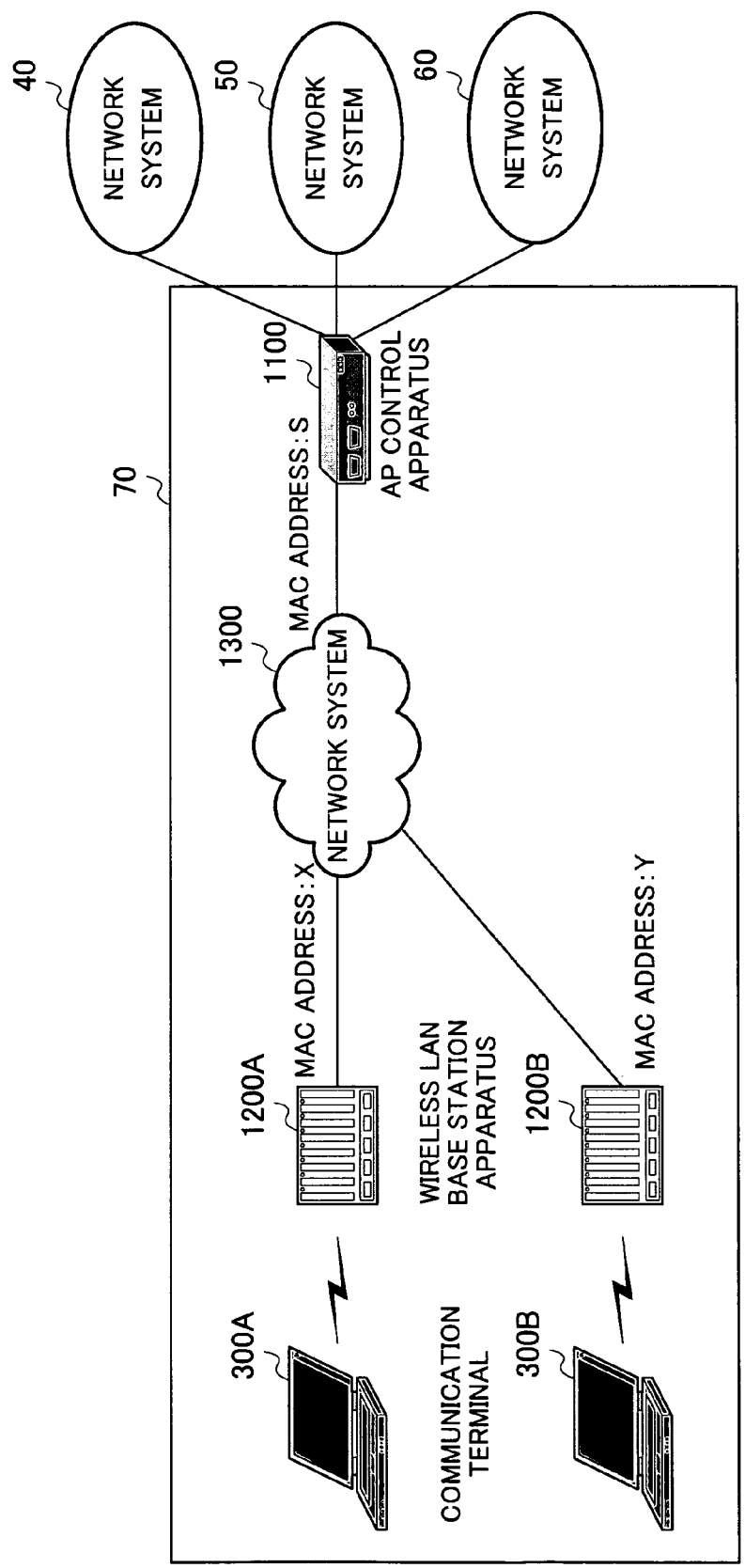
FIG. 32 is an overall configuration diagram of a communication system according to Embodiment 4.

As shown in the FIG. 32, communication system 70 according to Embodiment 4 is provided with wireless LAN base station apparatus 1200, AP control apparatus 1100 that forms data tunnels determined or defined by a base station MAC address of wireless LAN base station apparatus 1200 and the own control station MAC address and communicates using these data tunnels as a wireless LAN base station control apparatus, communication terminal 300 that accesses wireless LAN base station apparatus 1200 to communicate therewith and network system 1300. AP control apparatus 1100 is connected to a plurality of network systems (network systems 40 to 60 here) located outside when viewed from communication system 70.

Figure 33:
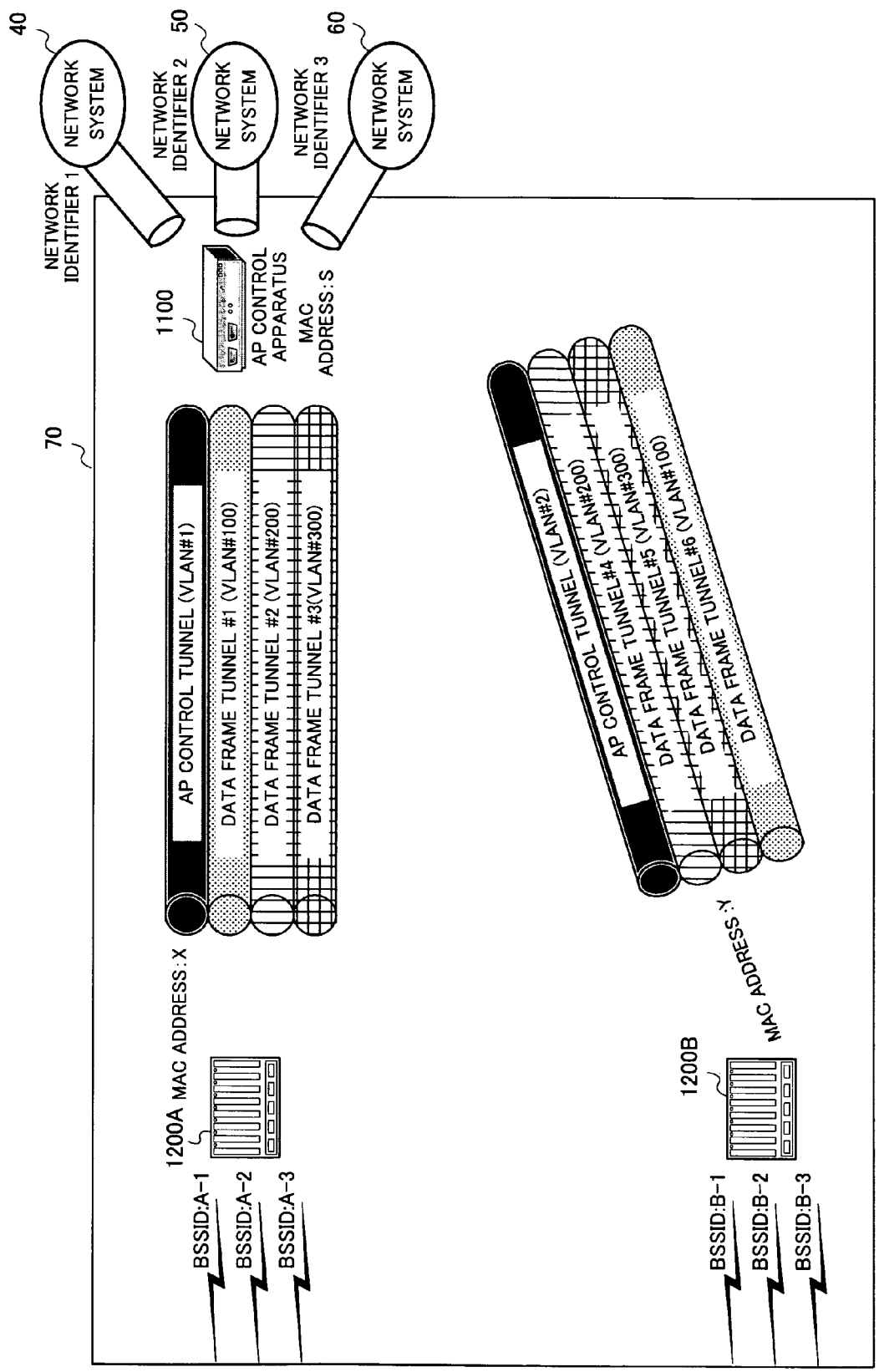
FIG. 33 illustrates data tunnels formed between an AP control apparatus and a wireless LAN base station apparatus in FIG. 32.

As shown in FIG. 33, in communication system 70 as in the case of AP control apparatus 500 and wireless LAN base station apparatus 600 in communication system 10A as described above, a data tunnel for passing a control frame and data tunnels for passing data frames other than the control frame are formed between AP control apparatus 1100 and wireless LAN base station apparatus 1200. As in the case of communication system 10A, communication system 70 can also form a plurality of data tunnels between AP control apparatus 1100 and wireless LAN base station apparatus 1200 and use different data tunnels according to the type of the frame (control frame, data frames other than the control frame or the like).

However, communication system 70 further groups formed data tunnels and forms a virtual LAN using the grouped data tunnels. More specifically, for example, data frame tunnel #1 and data frame tunnel #6 are assigned the same tunnel group identifier #100 and these data tunnels construct a virtual LAN. In this way, especially when broadcast frames are transmitted over a downlink, AP control apparatus 1100 need not create any unicast frame to each destination data tunnel, but can transmit broadcast frames in tunnel group units, and can thereby reduce the amount of processing at AP control apparatus 1100.

Furthermore, by associating identifiers of network systems outside AP control apparatus 1100 with tunnel group identifiers, AP control apparatus 1100 can determine to which virtual LAN data can be transmitted according to the network system from which a broadcast frame is transmitted and can thereby reduce the amount of processing. It is also possible to determine priority in tunnel group units using, for example, a priority bit of a VLAN tag.

Figure 34:
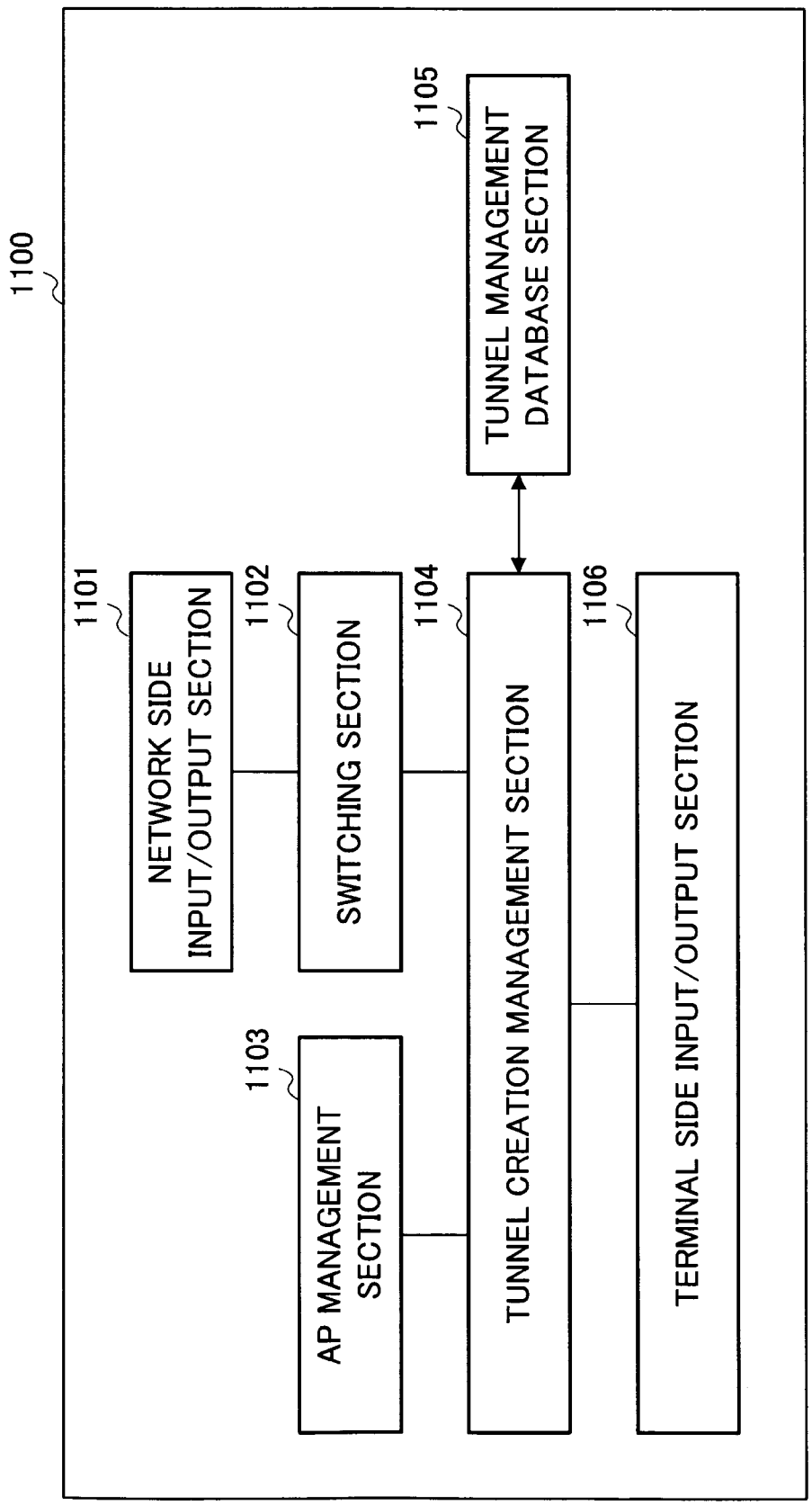
FIG. 34 is a block diagram showing the configuration of an AP control apparatus in FIG. 32.

As shown in FIG. 34, AP control apparatus 1100 is provided with network side input/output section 1101, switching section 1102, AP management section 1103, tunnel creation management section 1104, tunnel management database section 1105 and terminal side input/output section 1106.

Network side input/output section 1101 inputs/outputs frames to/from the network side, that is, network systems 40 to 60. More specifically, network side input/output section 1101 sends out frames input from network systems 40 to 60 to switching section 1102 and sends out frames input from switching section 1102 to network systems 40 to 60 to which frames should be transmitted.

Switching section 1102 switches frames input to any one of the network side and the terminal side. More specifically, switching section 1102 sends out frames input to network side input/output section 1101 or tunnel creation management section 1104. Furthermore, switching section 1102 creates a header of the 802.11 frame using the Ether header of the received frame or the like and performs preparation processing for the tunnel header creation processing at tunnel creation management section 1104.

AP management section 1103 performs processing for managing wireless LAN base station apparatus 1200. More specifically, AP management section 1103 generates an AP control frame to control wireless LAN base station apparatus 1200 and sends it out to tunnel creation management section 1104.

Tunnel creation management section 1104 creates data tunnels and manages tunnel management database section 1105 or the like. Furthermore, tunnel creation management section 1104 distributes frames input to different data tunnels. Moreover, when the input frame is a broadcast frame, it sends out the frame to a virtual LAN to which the frame should be sent out. Furthermore, tunnel creation management section 1104 performs tunnel header creation processing.

As shown in FIG. 35, tunnel management database section 1105 is provided with an AP control tunnel table, a data frame tunnel table, a data frame correspondence table and a group correspondence table.

As shown in FIG. 35A, the AP control tunnel table includes entries of data tunnels to communicate control frames and each data tunnel is defined (specified) by a set of a destination MAC address and a sender MAC address and further a VLAN tag ID.

As shown in FIG. 35B, the data frame tunnel table includes entries of data tunnels to communicate data frames and each data tunnel is defined (specified) by a set of a destination MAC address, a sender MAC address and a VLAN tag ID.

Moreover, the data frame tunnel table stores a tunnel identifier which consists of a set of the destination MAC address, sender MAC address and VLAN tag ID in correspondence with a tunnel group identifier. For example, tunnel ID 1 and tunnel ID 6 of the data frame tunnel table in FIG. 35B have the same tunnel group identifier #100 and the data tunnels specified by tunnel ID 1 and tunnel ID 6 form the identical virtual LAN.

As shown in FIG. 35C, the data frame correspondence table defines (specifies) which data tunnel should be used for each data frame. For example, when the terminal identifier of communication terminal 300A is assumed to be T1, the table defines (specifies) that the data tunnel with tunnel ID 1 of the data frame tunnel table is used when a data frame is exchanged between communication terminal 300A and the AP control apparatus 1100.

As shown in FIG. 35D, the group correspondence table stores network identifiers in correspondence with tunnel group identifiers. The group correspondence table is used especially when broadcast frames are transmitted over a downlink and stores network identifiers of network systems from which broadcast frames are transmitted in correspondence with tunnel group identifiers which specify a virtual LAN to which a broadcast frame should be send out.

Terminal side input/output section 1106 sends out a frame received from tunnel creation management section 1104 to wireless LAN base station apparatus 1200 and also sends out a frame from wireless LAN base station apparatus 1200 to tunnel creation management section 1104.

The operations of switching section 1102 and tunnel creation management section 1104 are identical as those of switching section 802 and tunnel creation management section 804 in Embodiment 3 (see FIG. 27 and FIG. 28), and descriptions thereof will be omitted.

Figure 36:
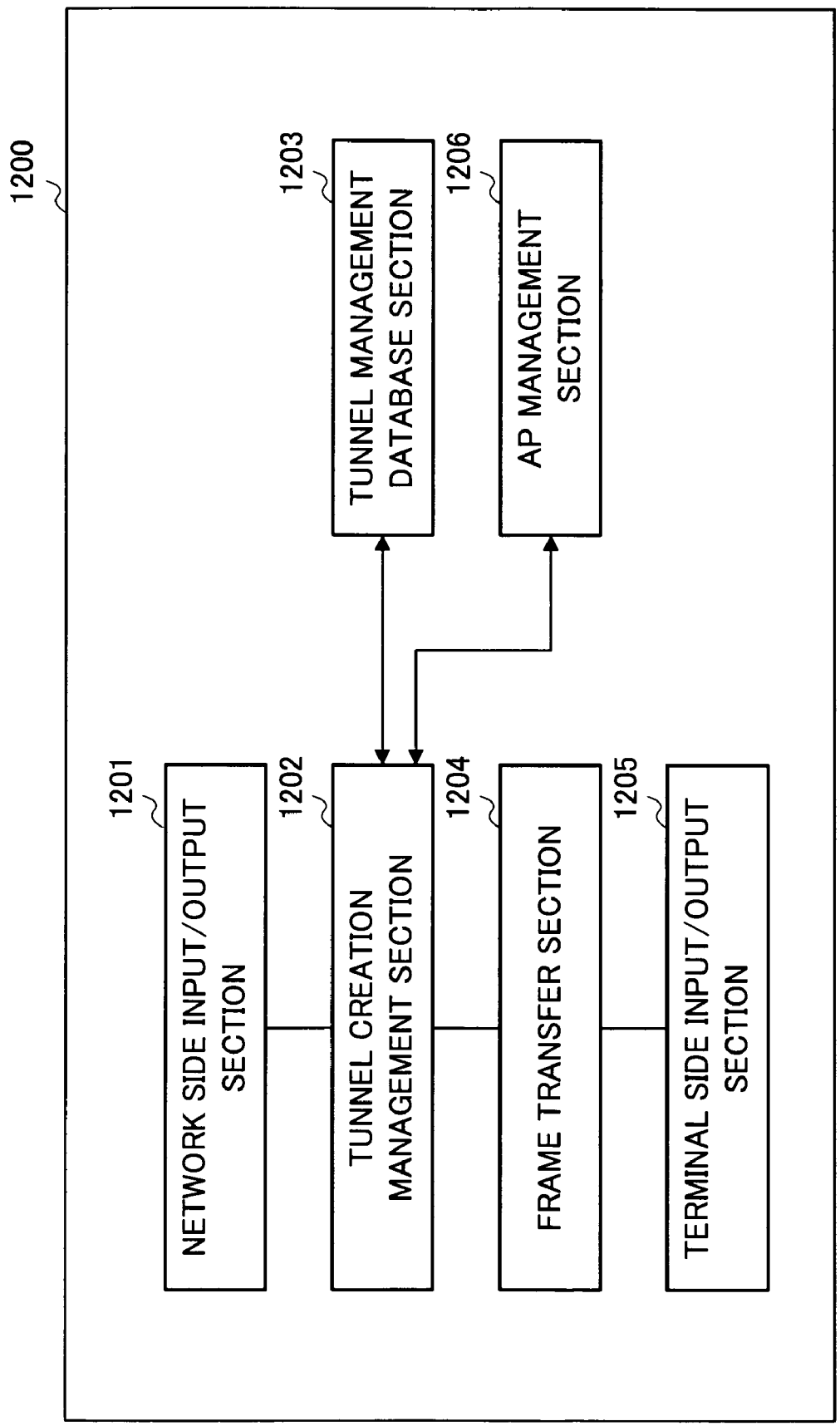
FIG. 36 is a block diagram showing the configuration of a wireless LAN base station apparatus in FIG. 32.

As shown in FIG. 36, wireless LAN base station apparatus 1200 is provided with network side input/output section 1201, tunnel creation management section 1202, tunnel management database section 1203, frame transfer section 1204, terminal side input/output section 1205 and AP management section 1206.

Network side input/output section 1201 inputs/outputs frames to/from the network side, that is, the AP control apparatus 1100 side. More specifically, network side input/output section 1201 sends out a frame which is input from AP control apparatus 1100 side to tunnel creation management section 1202 and also sends out a frame which is input from tunnel creation management section 1202 to AP control apparatus 1100.

Tunnel creation management section 1202 creates data tunnels and manages tunnel management database section 1203 or the like. Furthermore, tunnel creation management section 1202 distributes frames input to different data tunnels.

Tunnel management database section 1203 is provided with an AP control tunnel table and a data frame tunnel table as shown in FIG. 37.

As shown in FIG. 37A, the AP control tunnel table includes entries of a data tunnel to communicate a control frame and the data tunnel is defined by a set of a destination MAC address, a sender MAC address and a VLAN tag ID. Furthermore, the data tunnel is associated with a tunnel group identifier.

As shown in FIG. 37B, the data frame tunnel table includes entries of data tunnels to communicate data frames, and each data tunnel is defined (specified) by a set of a destination MAC address, a sender MAC address and further a VLAN tag ID. Furthermore, each data tunnel is associated with a tunnel group identifier.

Frame transfer section 1204 performs appropriate protocol processing on a frame received from tunnel creation management section 1202 and sends out the frame after the protocol processing to terminal side input/output section 1205. Furthermore, frame transfer section 1204 performs appropriate protocol processing on the frame received from terminal side input/output section 1205 and sends out the frame after the protocol processing to tunnel creation management section 1202.

Terminal side input/output section 1205 sends out a frame from communication terminal 300 to frame transfer section 1204 and also sends out a frame from frame transfer section 1204 to communication terminal 300.

AP management section 1206 performs processing for managing the own apparatus, that is, wireless LAN base station apparatus 1200. More specifically, it receives a control frame (hereinafter, referred to as an "AP control frame") to control wireless LAN base station apparatus 1200 from AP control apparatus 1100 and manages the own apparatus, generates a control frame to be sent out to AP control apparatus 1100 in response to the AP control frame and sends it out to tunnel creation management section 1202.

Figure 38:
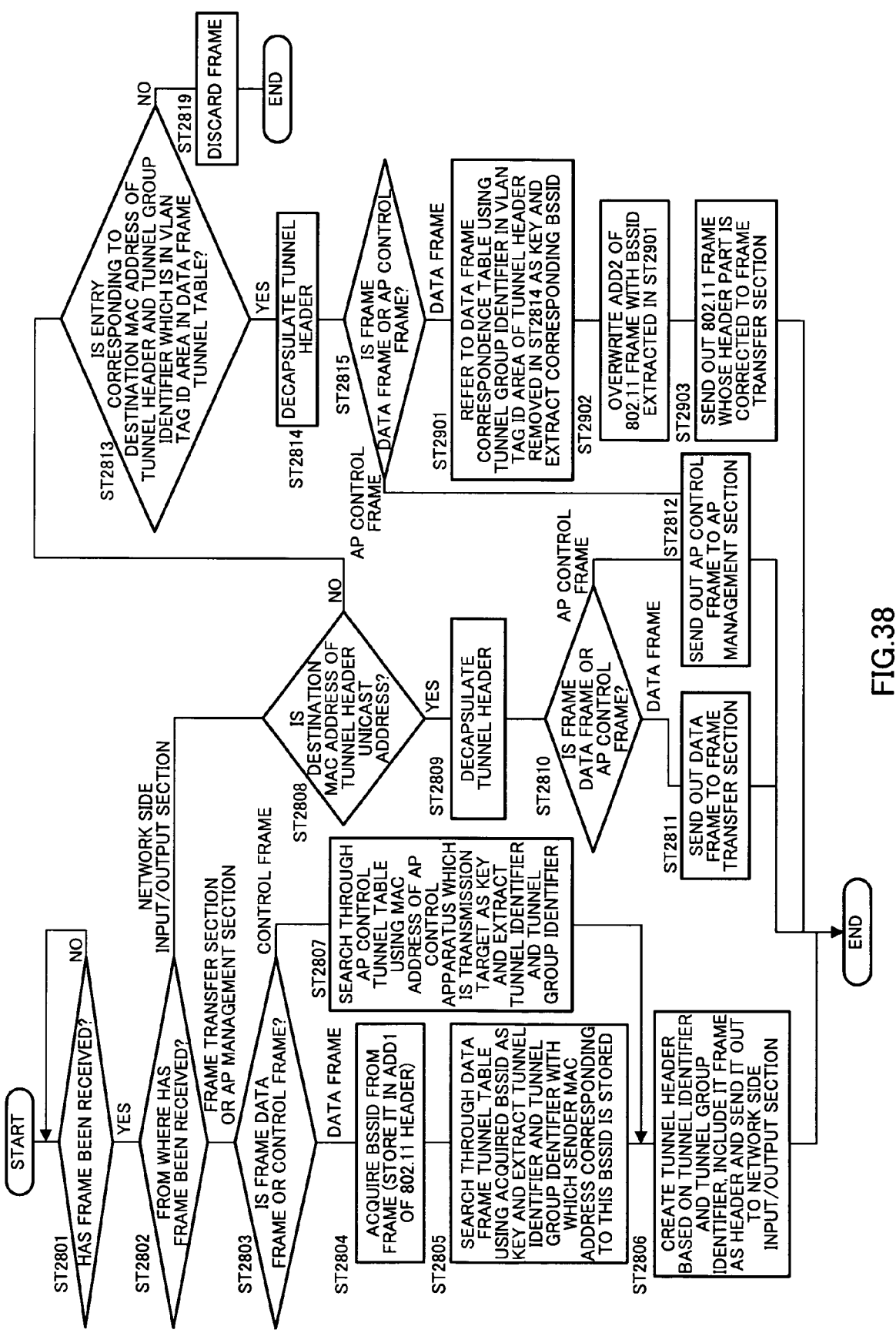
FIG. 38 is a flow chart illustrating the operation of a tunnel creation management section in FIG. 36.

Next, the operation of tunnel creation management section 1202 will be described with reference to FIG. 38. The operation is basically identical as that of tunnel creation management section 902 shown in FIG. 31, and only the differences will be described.

When the decision result in step ST2815 shows that the frame is a data frame, tunnel creation management section 1202 refers to the data frame correspondence table using the tunnel group identifier included in the VLAN tag ID area of the tunnel header removed in step ST2814 as a key and extracts the corresponding BSSID (step ST2901).

In step ST2902, tunnel creation management section 1202 overwrites Add2 (a broadcast address is stored here) of the 802.11 frame with the BSSID extracted in step ST2901.

In step ST2903, tunnel creation management section 1202 sends out the 802.11 frame whose header part has been corrected in step ST2902 to frame transfer section 1204.

In this way, according to Embodiment 4, AP control apparatus 1100 is provided with tunnel creation management section 1104 as the tunnel formation management section that forms a plurality of data tunnels and as the control section that transmits data using different data tunnels according to the type of the transmission data. This tunnel creation management section 1104 adds tunnel group identification information to the data tunnel formed between the AP control apparatus and different wireless LAN base station apparatuses to form a virtual LAN according to the tunnel group identification information.

By this means, it is possible to group a plurality of data tunnels and thereby easily perform control in a unit greater than a data tunnel (virtual LAN).

A first aspect of the communication system of the present invention adopts a configuration including a wireless LAN base station apparatus and a wireless LAN base station control apparatus provided with a tunnel formation management section that forms a plurality of data tunnels therefrom to the wireless LAN base station apparatus and a control section that transmits data using different data tunnels according to the type of the transmission data.

According to this configuration, for example, by using different data tunnels for control data and for data other than the control data, the reliability that the control data arrives at the destination wireless LAN base station apparatus increases, and consequently the reliability of the control between the AP control apparatus and the wireless LAN base station apparatus increases. Therefore, it is possible to improve the stability and safety of communications in the communication system.

A second aspect of the communication system of the present invention adopts a configuration, wherein the tunnel formation management section forms a first one of the data tunnels defined by a base station MAC address of the wireless LAN base station apparatus and a control station MAC address of the own apparatus and further a second one of the data tunnels with base station identification information of the wireless LAN base station apparatus other than the base station MAC address and the control station MAC address.

According to this configuration, it is possible to form a plurality of data tunnels logically separated between the wireless LAN base station apparatus and the wireless LAN base station control apparatus.

A third aspect of the communication system of the present invention adopts a configuration, wherein the tunnel formation management section uses a BSSID as the base station identification information.

According to this configuration, by using the BSSID assigned to the communication terminal which communicates with the wireless LAN base station apparatus as the base station identification information (for example, MAC address) of the wireless LAN base station apparatus as is, once a BSSID assigned to the communication terminal is determined, the data tunnel through which the transmission data which is transmitted/received to/from the communication terminal passes is uniquely determined.

A fourth aspect of the communication system of the present invention adopts a configuration, wherein the control section transmits control data using the first one of the data tunnels and transmits data other than the transmission data using the second one of the data tunnels.

According to this configuration, by using different data tunnels for control data and for data other than the control data, the reliability that the control data arrives at the destination wireless LAN base station apparatus increases, and consequently the reliability of the control between the AP control apparatus and the wireless LAN base station apparatus increases. Therefore, it is possible to improve the stability and safety of communications in the communication system.

A fifth aspect of the communication system of the present invention adopts a configuration, wherein the tunnel formation management section forms the plurality of data tunnels according to data tunnel identification information.

According to this configuration, it is possible to form a plurality of data tunnels logically separated between the wireless LAN base station apparatus and the wireless LAN base station control apparatus.

A sixth aspect of the communication system of the present invention adopts a configuration including a plurality of the wireless LAN base station apparatuses, wherein the tunnel formation management section adds tunnel group identification information to data tunnels formed therefrom to different wireless LAN base station apparatuses to form a virtual LAN according to the tunnel group identification information.

According to this configuration, it is possible to group a plurality of data tunnels and thereby easily perform control in a unit greater than a data tunnel (virtual LAN).

A first aspect of the wireless LAN base station control apparatus of the present invention adopts a configuration including a tunnel formation management section that forms a plurality of data tunnels and a control section that transmits data using different data tunnels according to the type of the transmission data.

According to this configuration, for example, by using different data tunnels for control data and for data other than the control data, the reliability that the control data arrives at the destination increases, and it is consequently possible to improve the stability and safety of communications in the communication system.

A second aspect of the wireless LAN base station control apparatus of the present invention adopts a configuration, wherein the tunnel formation management section forms a first one of the data tunnels defined by a base station MAC address of the wireless LAN base station apparatus and a control station MAC address of the own apparatus and further a second one of the data tunnels with base station identification information of the wireless LAN base station apparatus other than the base station MAC address and the control station MAC address.

According to this configuration, it is possible to form a plurality of data tunnels logically separated between the wireless LAN base station apparatus and the wireless LAN base station control apparatus.

A third aspect of the wireless LAN base station control apparatus of the present invention adopts a configuration, wherein the tunnel formation management section uses a BSSID as the base station identification information.

According to this configuration, by using the BSSID assigned to the communication terminal which communicates with the wireless LAN base station apparatus as the base station identification information (for example, MAC address) of the wireless LAN base station apparatus as is, once the BSSID assigned to the communication terminal is determined, the data tunnel through which the transmission data which is transmitted/received to/from the communication terminal passes is uniquely determined.

A fourth aspect of the wireless LAN base station control apparatus of the present invention adopts a configuration, wherein the control section transmits control data using the first one of the data tunnels and transmits data other than the transmission data using the second one of the data tunnels.

According to this configuration, by using different data tunnels for control data and for data other than the control data, the reliability that the control data arrives at the destination wireless LAN base station apparatus increases, and consequently the reliability of the control between the AP control apparatus and the wireless LAN base station apparatus increases. Therefore, it is possible to improve the stability and safety of communications in the communication system.

A fifth aspect of the wireless LAN base station control apparatus of the present invention adopts a configuration, wherein the tunnel formation management section forms the plurality of data tunnels according to data tunnel identification information.

According to this configuration, it is possible to form a plurality of logically separated data tunnels.

A sixth aspect of the wireless LAN base station control apparatus of the present invention adopts a configuration, wherein the tunnel formation management section adds tunnel group identification information to the data tunnels formed therefrom to different wireless LAN base station apparatuses to form a virtual LAN according to the tunnel group identification information.

According to this configuration, it is possible to group a plurality of data tunnels and thereby easily perform control in a unit greater than a data tunnel (virtual LAN).

A first aspect of the wireless LAN base station apparatus of the present invention adopts a configuration including a tunnel formation management section that forms a plurality of data tunnels and a control section that transmits data using different data tunnels according to the type of the transmission data.

According to this configuration, for example, by using different data tunnels for control data and for data other than the control data, the reliability that the control data arrives at the destination increases, and it is consequently possible to improve the stability and safety of communications in the communication system.

A second aspect of the wireless LAN base station apparatus of the present invention adopts a configuration, wherein the tunnel formation management section forms a first one of the data tunnels defined by a base station MAC address of the own apparatus and a control station MAC address and further a second one of the data tunnels with base station identification information other than the base station MAC address and the control station MAC address.

According to this configuration, it is possible to form a plurality of data tunnels logically separated between the wireless LAN base station apparatus and the wireless LAN base station control apparatus.

A third aspect of the wireless LAN base station apparatus of the present invention adopts a configuration, wherein the tunnel formation management section uses a BSSID as the base station identification information.

According to this configuration, by using the BSSID assigned to the communication terminal which communicates with the wireless LAN base station apparatus as the base station identification information (for example, MAC address) of the wireless LAN base station apparatus as is, once the BSSID assigned to the communication terminal is determined, the data tunnel through which the transmission data which is transmitted/received to/from the communication terminal passes is uniquely determined.

A fourth aspect of the wireless LAN base station apparatus of the present invention adopts a configuration, wherein the control section transmits control data using the first one of the data tunnels and transmits data other than the transmission data using the second one of the data tunnels.

According to this configuration, by using different data tunnels for control data and for data other than the control data, the reliability that the control data arrives at the destination wireless LAN base station apparatus increases, and consequently the reliability of the control between the AP control apparatus and the wireless LAN base station apparatus increases. Therefore, it is possible to improve the stability and safety of communications in the communication system.

A fifth aspect of the wireless LAN base station apparatus of the present invention adopts a configuration, wherein the tunnel formation management section forms the plurality of data tunnels according to data tunnel identification information.

According to this configuration, it is possible to form a plurality of logically separated data tunnels.

The present application is based on Japanese Patent Application No. 2004-201945 filed on Jul. 8, 2004 and Japanese Patent Application No. 2004-308443 filed on Oct. 22, 2004, entire content of which is expressly incorporated by reference herein.

Industrial Applicability

The communication system, wireless LAN base station control apparatus and wireless LAN base station apparatus according to the present invention form a plurality of data tunnels between the wireless LAN base station control apparatus and the wireless LAN base station apparatus and use different data tunnels according to the type of the frame, thereby have the effect of being able to increase the reliability of the control between the wireless LAN base station control apparatus and the wireless LAN base station apparatus and improve the stability and safety of communications, and are effective for a wireless LAN communication system, access point control apparatus which constructs this system and access points.

The invention claimed is:

1. A communication system comprising:
a base station control apparatus configured to form a first data tunnel and a second data tunnel between the control apparatus and a base station, to transmit control data for controlling the base station through the first data tunnel, and to transmit non-control data intended for a terminal apparatus in communication with the base station through the second data tunnel; and
the base station configured to forward the non-control data received through the second data tunnel to the terminal apparatus using an identifier assigned to the terminal apparatus,
wherein the first data tunnel is defined by an address of the base station and an address of the control apparatus, and
the second data tunnel is defined by the identifier assigned to the terminal apparatus and the address of the control apparatus.

2. The communication system according to claim 1, further comprising a plurality of base stations,
wherein the control apparatus is further configured to assign tunnel group identification information to a group of data tunnels formed between the control apparatus and the plurality of base stations, respectively, and to form at least one virtual local area network using the group of data tunnels identified by the tunnel group identification information.

3. A base station control apparatus comprising:
a tunnel management section configured to form a first data tunnel and a second data tunnel between the control apparatus and a base station; and
a control section configured to transmit control data for controlling the base station through the first data tunnel, and to transmit non-control data intended for a terminal apparatus in communication with the base station through the second data tunnel,
wherein the base station is configured to forward the non-control data received through the second data tunnel to the terminal apparatus using an identifier assigned to the terminal apparatus,
the first data tunnel is defined by an address of the base station and an address of the control apparatus, and
the second data tunnel is defined by the identifier assigned to the terminal apparatus and the address of the control apparatus.

4. The control apparatus according to claim 3, wherein the tunnel management section is further configured to assign tunnel group identification information to a group of data tunnels formed between the control apparatus and a plurality of base stations, respectively, and to form at least one virtual local area network using the group of data tunnels identified by the tunnel group identification information.

5. A base station comprising:
a tunnel management section configured to form a first data tunnel and a second data tunnel between the base station and a base station control apparatus; and
a control section configured to receive control data for controlling the base station through the first data tunnel, and to receive non-control data intended for a terminal apparatus in communication with the base station through the second data tunnel; and
a forwarding section configured to forward the non-control data received through the second data tunnel to the terminal apparatus using an identifier assigned to the terminal apparatus,
wherein the first data tunnel is defined by an address of the base station and an address of the control apparatus, and
the second data tunnel is defined by the identifier assigned to the terminal apparatus and the address of the control apparatus.

6. The communication system according to claim 1, wherein the identifier assigned to the terminal apparatus is a basic service set identifier (BSSID).

7. The communication system according to claim 6, wherein the BSSID assigned to the terminal apparatus is used as a media access control (MAC) address of the base station.

8. The communication system according to claim 1, wherein the address of the base station is a media access control (MAC) address of the base station, and the address of the control apparatus is a media access control (MAC) address of the control apparatus.

9. The communication system according to claim 1, wherein the control apparatus is further configured to form a plurality of second data tunnels between the control apparatus and the base station, through which non-control data respectively intended for a plurality of terminal apparatuses are respectively transmitted, the plurality of terminal apparatuses being in communication with the base station and being assigned different identifiers, respectively,
each of the plurality of second data tunnels is defined by the address of the control apparatus and the identifier assigned to one of the plurality of terminal apparatuses, through which non-control data intended for that terminal apparatus is transmitted, and
the base station is configured to forward the non-control data, which are respectively intended for the plurality of terminal apparatuses and received through the respective second data tunnels defined by the respective identifiers, to the intended terminal apparatuses using the identifiers that are respectively assigned to the intended terminal apparatuses.

10. The communication system according to claim 1, which is applied in a wireless local area network.

11. The control apparatus according to claim 3, wherein the identifier assigned to the terminal apparatus is a basic service set identifier (BSSID).

12. The communication system according to claim 11, wherein the BSSID assigned to the terminal apparatus is used as a media access control (MAC) address of the base station.

13. The control apparatus according to claim 3, wherein the address of the base station is a media access control (MAC) address of the base station, and the address of the control apparatus is a media access control (MAC) address of the control apparatus.

14. The control apparatus according to claim 3, wherein the tunnel management section is further configured to form a plurality of second data tunnels, through which to transmit non-control data respectively intended for a plurality of terminal apparatuses, respectively, wherein the plurality of terminal apparatuses are in communication with the base station, and
the tunnel management section is further configured to assign different identifiers to the plurality of terminal apparatuses, respectively, to define each of the plurality of second data tunnels by the address of the control apparatus and the identifier assigned to one of the plurality of terminal apparatuses.

15. The control apparatus according to claim 3, which is a wireless local area network base station control apparatus.

16. The base station according to claim 5, wherein the identifier assigned to the terminal apparatus is a basic service set identifier (BSSID).

17. The communication system according to claim 16, wherein the BSSID assigned to the terminal apparatus is used as a media access control (MAC) address of the base station.

18. The base station according to claim 5, wherein the address of the base station is a media access control (MAC) address of the base station, and the address of the control apparatus is a media access control (MAC) address of the control apparatus.

19. The base station according to claim 5, wherein the tunnel management section is further configured to form a plurality of second data tunnels, through which to receive non-control data respectively intended for a plurality of terminal apparatuses, respectively, wherein the plurality of terminal apparatuses are in communication with the base station and are assigned different identifiers, respectively, each of the plurality of second data tunnels is defined by the address of the control apparatus and the identifier assigned to one of the plurality of terminal apparatuses, through which non-control data intended for that terminal apparatus is received, and the forwarding section is configured to forward the non-control data, which are respectively intended for the plurality of terminal apparatuses and received through the respective second data tunnels defined by the respective identifiers, to the intended terminal apparatuses using the identifiers that are respectively assigned to the intended terminal apparatuses.

20. The base station according to claim 5, which is a wireless local area network base station.

* * * * *